United States Patent
Ohsawa

(10) Patent No.: US 6,266,449 B1
(45) Date of Patent: Jul. 24, 2001

(54) INFORMATION PROCESSING APPARATUS AND METHOD WHICH SELECTIVELY CONTROLS DATA ENCODING BY MONITORING AMOUNT OF ENCODED DATA

(75) Inventor: Hidefumi Ohsawa, Kawaguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/753,006

(22) Filed: Nov. 19, 1996

(30) Foreign Application Priority Data

Nov. 22, 1995 (JP) .................................................. 7-304374
Mar. 19, 1996 (JP) .................................................. 8-062828

(51) Int. Cl.⁷ ................................ G06K 9/36; G06K 9/46
(52) U.S. Cl. ............................ 382/239; 358/457; 382/237
(58) Field of Search ............................ 395/114; 382/237, 382/239, 244; 358/429, 539, 467, 457, 261.2, 430; 348/410, 419; 341/56, 76

(56) References Cited

U.S. PATENT DOCUMENTS

| | | | |
|---|---|---|---|
| 3,961,365 | * 6/1976 | Payne et al. .......................... | 348/803 |
| 4,215,374 | * 7/1980 | Mizuno ................................. | 358/430 |
| 4,280,144 | * 7/1981 | Bacon ................................... | 382/270 |
| 5,283,656 | * 2/1994 | Sugahara .............................. | 358/430 |
| 5,317,428 | * 5/1994 | Osawa et al. ......................... | 358/539 |
| 5,363,219 | * 11/1994 | Yoshida ................................ | 358/539 |
| 5,402,244 | * 3/1995 | Kim ...................................... | 358/430 |
| 5,479,587 | * 12/1995 | Campbell et al. .................... | 395/114 |
| 5,553,160 | * 9/1996 | Dawson ................................ | 382/239 |
| 5,598,213 | * 1/1997 | Chung et al. ......................... | 348/405 |
| 5,602,976 | * 2/1997 | Cooper et al. ........................ | 395/114 |
| 5,677,736 | * 10/1997 | Suzuki et al. ........................ | 358/430 |

* cited by examiner

Primary Examiner—Jon Chang
Assistant Examiner—Timothy M. Johnson
(74) Attorney, Agent, or Firm—Fitzpatrick, Cella, Harper & Scinto

(57) ABSTRACT

The invention provides an information processing apparatus in which data is encoded with a desired compression ratio without producing significant degradation in the quality of the encoded data. The apparatus includes: a monitor for monitoring the amount of encoded image data which has already been generated prior to current image data to be encoded; and an encoder for encoding the current image data to be encoded selectively using either a reversible encoding algorithm or an irreversible encoding algorithm wherein the encoding algorithm is selected depending on the above-described amount of codes.

7 Claims, 24 Drawing Sheets

MULTILEVEL DITHERING CIRCUIT

| 10 | 42 |
|----|----|
| 53 | 21 |

FIRST
THRESHOLD
MATRIX

| 74  | 116 |
|-----|-----|
| 137 | 95  |

SECOND
THRESHOLD
MATRIX

| 153 | 200 |
|-----|-----|
| 221 | 179 |

THIRD
THRESHOLD
MATRIX

4-LEVEL DITHERING THRESHOLD

FIG. 4

| FLAG AREA | BAND SEGMENTATION |
|:---:|:---:|
| 0 | BAND 0 |
| 0 | BAND 1 |
| 1 | BAND 2 |
| 1 | BAND 3 |
| 0 | BAND 4 |
| 1 | BAND 5 |

PIXEL TO BE ENCODED

2-LEVEL DITHERING THRESHOLD

FIG. 20

| AMOUNT OF GENERATED CODES | FROM | TO |
|---|---|---|
| UPPER LIMIT < AMOUNT | MODE 0 | MODE 2 |
| | MODE 1 | MODE 3 |
| | MODE 2 | MODE 3 |
| | MODE 3 | MODE 3 |
| TARGET VALUE < AMOUNT < UPPER LIMIT | MODE 0 | MODE 1 |
| | MODE 1 | MODE 2 |
| | MODE 2 | MODE 3 |
| | MODE 3 | MODE 3 |
| LOWER LIMIT < AMOUNT < TARGET VALUE | MODE 0 | MODE 0 |
| | MODE 1 | MODE 1 |
| | MODE 2 | MODE 2 |
| | MODE 3 | MODE 0 |
| AMOUNT < LOWER LIMIT | MODE 1 | MODE 0 |
| | MODE 2 | MODE 0 |
| | MODE 3 | MODE 1 |

FIG. 21

| 10 | 116 |
|---|---|
| 179 | 53 |

| 21 | 137 |
|---|---|
| 200 | 74 |

| 42 | 158 |
|---|---|
| 221 | 95 |

FIG. 23
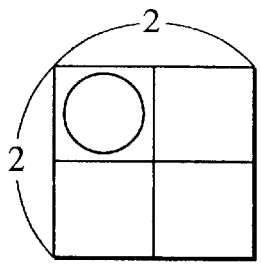 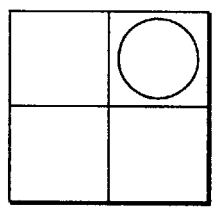 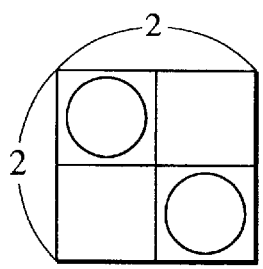 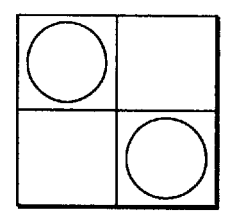
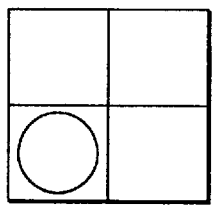 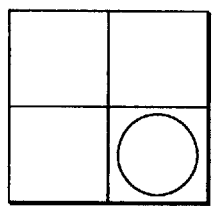 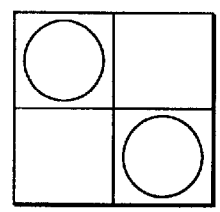 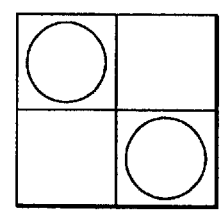
MODE 1     MODE 2
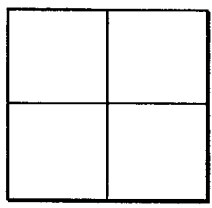 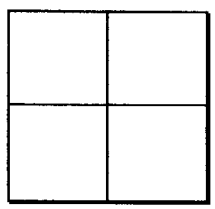 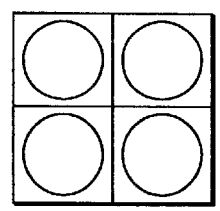 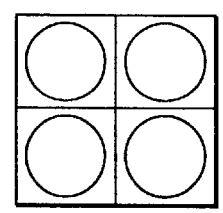
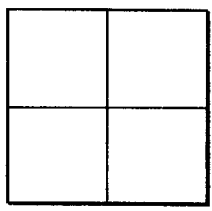 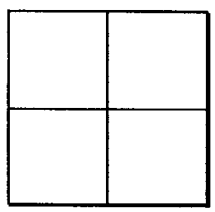 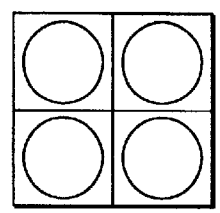 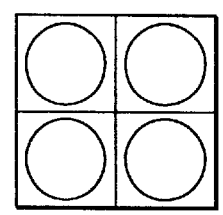
MODE 0     MODE 3

FIG. 26

| 10 | 116 |
|----|-----|
| 279 | 53 |

FIRST
THRESHOLD
MATRIX

| 21 | 137 |
|----|-----|
| 200 | 74 |

SECOND
THRESHOLD
MATRIX

| 42 | 158 |
|----|-----|
| 221 | 95 |

THIRD
THRESHOLD
MATRIX

INFORMATION PROCESSING APPARATUS AND METHOD WHICH SELECTIVELY CONTROLS DATA ENCODING BY MONITORING AMOUNT OF ENCODED DATA

BACKGROUND OF THE INVENTION

1. Field of the Invention

The present invention relates to a method and apparatus for processing information, and more particularly, to a method and apparatus for encoding image data.

2. Description of the Related Art

In a data encoding technique widely used to encode digital monochrome binary image data, image data is encoded raster by raster. For example, in MH, MR, and MMR techniques used in facsimiles, variable-length encoding is employed, in which image data is encoded on the basis of the length of succession of either white or black pixels (run length).

A fixed-length encoding technique is also used. One technique of the fixed-length encoding is vector quantization in which an image data is divided into blocks and a fixed-length code is assigned to each block. In this technique, encoding is performed with a constant compression ratio. However, the information quality of coded data differs from block to block and thus the quality of decoded data or the quality of a reproduced image varies from block to block.

In image communication devices such as a facsimile device, a reversible encoding algorithm is usually employed so that a decoding device can reproduce an image identical to the original image. In some cases, an irreversible coding algorithm is also employed so as to achieve a higher compression ratio although a certain degree of degradation occurs in a reproduced image.

As described above, in variable-length encoding, the amount of generated codes varies depending on the image, and thus the disadvantage of this technique is that it is difficult to encode the data with a compression ratio no greater than a particular desired value (and thus it is difficult to encode the data with a particular memory capacity).

On the other hand, in fixed-length encoding, although it is possible to maintain the compression ratio at a desired value, there is a problem that local degradation occurs in the quality of decoded data.

SUMMARY OF THE INVENTION

Accordingly, it is an object of the present invention to provide an apparatus for coding image data with a compression ratio no greater than a desired value, beyond which there could be produced significant degradation in the quality of the image due to the encoding/decoding process.

To achieve the above object, the present invention in one aspect thereof provides an information processing apparatus including: monitoring means for monitoring the amount of codes associated with image data which has previously been encoded; and encoding means for encoding image data to be encoded using either a reversible encoding algorithm or an irreversible encoding algorithm selected depending on the amount of codes associated with the previously encoded image data.

Another object of the present invention is to provide an apparatus for coding color image data with a desired compression ratio without producing significant degradation in the quality of the image due to the encoding process.

To achieve the above object, the present invention in another aspect provides an information processing apparatus including: monitoring means for monitoring the amount of encoded color image data which has already been generated; selection means for selecting an encoding algorithm from a plurality of encoding algorithms having various compression ratios, the selection of the encoding algorithm being performed on the basis of the amount of generated codes; and encoding means for encoding the color image data to be encoded in accordance with the selected encoding algorithm, wherein the encoding means encodes a plurality of components constituting the data representing the color image, and the compression ratio is changed by changing the compression ratio associated with each component constituting the color image.

Still another object of the present invention is to prevent a visible difference in the image quality among large areas.

To achieve the above object, the present invention in still another aspect provides an information processing apparatus including: monitoring means for monitoring the amount of codes associated with an image which has already been encoded; selection means for selecting whether a pixel to be encoded is encoded in the form of an M-level pixel or in the form of an N-level pixel, said selection being performed on the basis of said amount of codes, where $N \neq M$; and encoding means for encoding the block of image to be encoded on the basis of the selection result given by said selection means.

A further object of the present invention is to provide an apparatus for decoding data in a manner which allows the data to be encoded in an improved efficiency.

To achieve the above object, the present invention in another aspect provides an information processing apparatus capable of decoding first encoded data which has been encoded using a first encoding algorithm and also capable of decoding second encoded data which has been encoded using a second encoding algorithm different from the first encoding algorithm, the apparatus comprising: monitoring means for monitoring the amount of codes associated with first data to be decoded which has been input prior to second data to be decoded; and decoding means for decoding the second data to be decoded selectively using a first decoding algorithm corresponding to the first encoding algorithm or a second decoding algorithm corresponding to the second encoding algorithm, the selection of the decoding algorithm being performed on the basis of the monitoring result of the monitoring means.

Furthermore, it is another object of the present invention to provide an image forming apparatus which can achieve any of the above objects and which has the capability of converting the image data described in a printing language such as the PDL (Page Description Language) into the format which can be dealt with by a printer and supplied the resultant data to the printer.

To achieve the above object, the present invention in another aspect provides an image forming apparatus including: input means for inputting image data described in a page description language; storage means for converting the input image data into a different format and storing the resultant image data in a predetermined memory; monitoring means for monitoring the amount of codes associated with image data which has previously been encoded and which is stored in the storage means; encoding means for encoding the image data to be encoded selectively using one of a reversible encoding algorithm and an irreversible encoding algorithm, the selection of the encoding algorithm being performed on the basis of the amount of codes associated with the previously encoded image data; decoding means for decoding the encoded image data to be decoded selectively using a decoding algorithm corresponding to one of the reversible decoding algorithm and the irreversible decoding algorithm; and output means for outputting the decoded image data to a printer.

The foregoing and other objects, features and advantages of the invention will be apparent from the following more particular description of preferred embodiments of the invention as illustrated in conjunction with the accompanying drawings.

BRIEF DESCRIPTION OF THE DRAWINGS

FIG. 4 is a diagram which illustrates a method of dividing an image into bands;

FIG. 20 is a reference table which is referred to in the switching operation;

FIG. 21 is a diagram which illustrates 4-level dithering threshold matrices existing in the fourth embodiment;

FIG. 23 is a diagram which illustrates a method of controlling the dot position of 2-level image data in the fifth embodiment;

FIG. 26 illustrates 4-level dithering threshold matrices which may be used in the sixth embodiment;

DESCRIPTION OF THE PREFERRED EMBODIMENTS

First Embodiment

Figure 1:
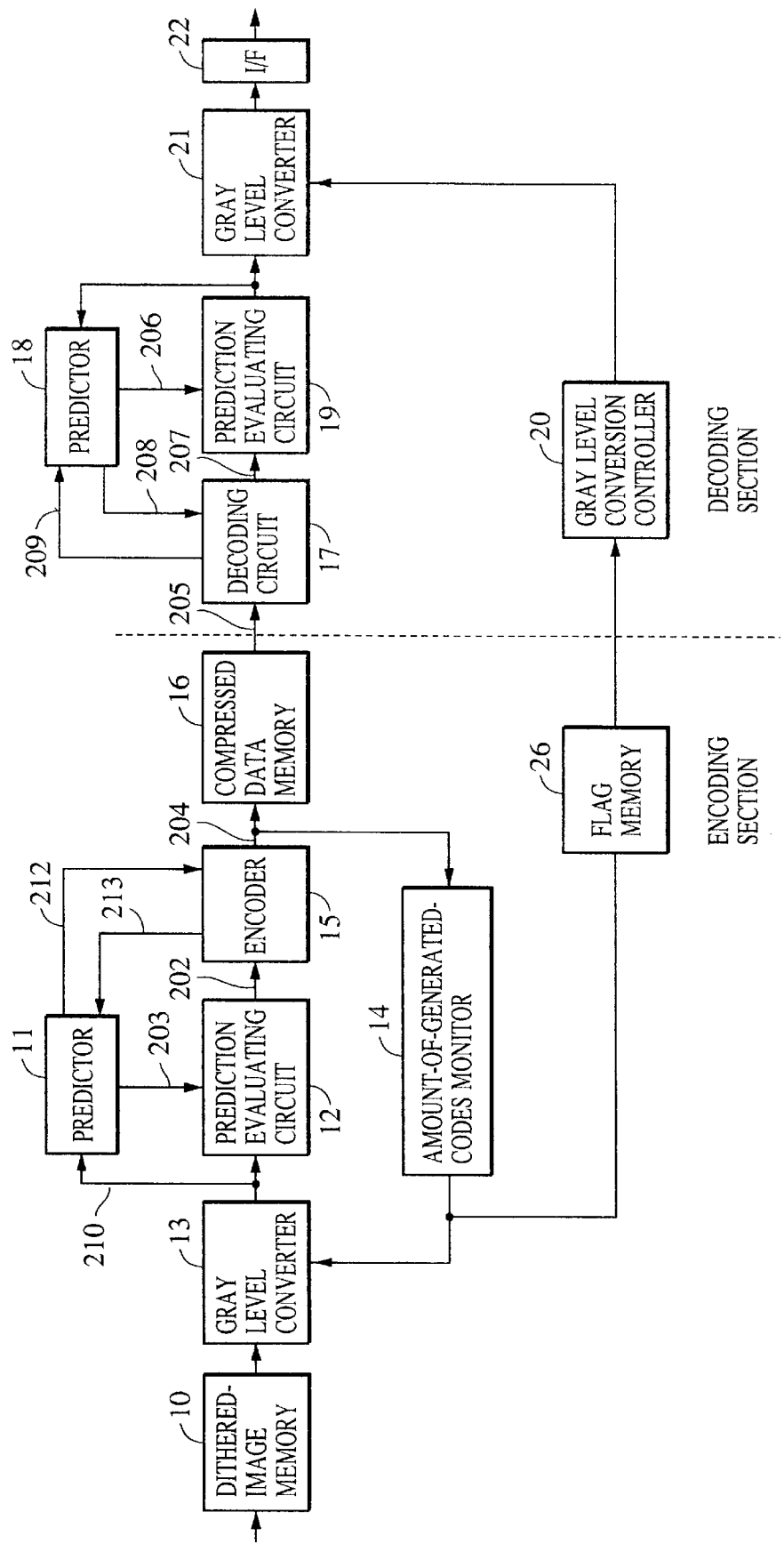
FIG. 1 is a block diagram illustrating a first embodiment according to the invention.

FIG. 1 is a block diagram generally illustrating the construction of an information processing apparatus according to a first embodiment of the present invention.

The apparatus includes an encoding section which comprises: a dithered image memory 10; a predictor 11; a prediction evaluating circuit 12; a gray level converter 13; an amount-of-generated-codes monitor 14; an encoder 15; a flag memory 26; and a compressed data memory 16. The apparatus also includes a decoding section which comprises: a decoding circuit 17; a predictor 18; a prediction evaluating circuit 19; a gray level conversion controller 20; a gray level converter 21; and an interface circuit 22.

Figures 2, 3:
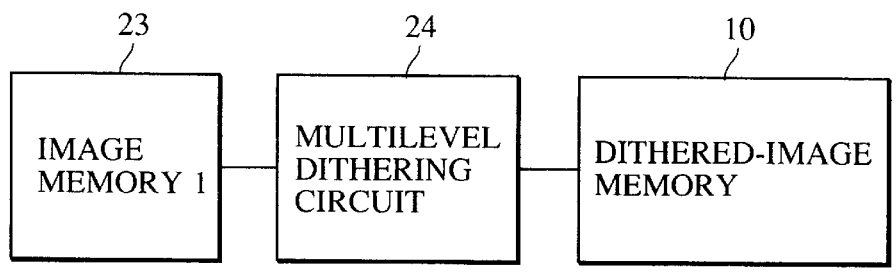
FIG. 2 is a block diagram of a multilevel dithering circuit which may be used in the embodiment of FIG. 1.
FIG. 3 is a diagram which illustrates multilevel dithering threshold matrices.

The dithered image memory 10 stores image information in the form of 2 bits/pixel obtained by the conversion with a multilevel dithering circuit 24 shown in FIG. 2.

In the block diagram of FIG. 2 is shown a 4-level dithering circuit as an example of the multilevel dithering circuit. 8-bit image information stored in an image memory 23 is transferred to the multilevel dithering circuit 24. The multilevel dithering circuit 24 performs 4-level dithering on the received 8-bit image information using threshold matrices which will be described later with reference to FIG. 3. The resultant data is stored in the dithered image memory 10. The 4-level dithering circuit is a simple circuit including a comparator for comparing the image information with a threshold, and will not be described here in further detail.

The gray level converter 13 (FIG. 1) successively converts the 2-bit-per-pixel dithered image information into 1-bit-per-pixel dithered image information for each pixel of the image information. The resultant 1-bit data is output as information 210. The simplest method of the conversion is to employ the most significant bit (MSB) of each pixel's two-bit information. The conversion of the dithered image information will be described in further detail hereinafter.

The information 210 is supplied to the predictor 11 which predicts whether a pixel to be encoded will be 0 or 1 on the basis of 1-bit information of neighboring pixels which have been encoded prior to encoding of the current pixel. Predicted image information (predicted symbol) 203 as well as an index 212 which will be described later are output from the predictor 11 and supplied to the prediction evaluating circuit 12. As will be described in further detail hereinafter, updated information 213 is input from the encoder 15 to the predictor 11.

The prediction evaluating circuit 12 judges whether the value (0/1) of the image information associated with the current pixel to be encoded given as the information 210 is identical to the predicted symbol 203. The information representing the judgement result is output to the encoder 15 and is encoded by it.

The information encoded by the encoder 15 is stored in the compressed data memory 16. After completion of the above-described encoding of the image information, a decoding operation is started.

The decoding circuit 17 decodes the encoded data thereby reproducing the information (information 202) representing the prediction evaluation result made by the prediction evaluating circuit 12. The resultant decoded data is output as information 207. The predictor 18, having the same construction as the predictor 11, predicts the value (0 or 1) of the pixel to be processed on the basis of the 1-bit information of the neighboring pixels which have been decoded and outputs the result as a predicted symbol 206 (which is equal to the predicted symbol 203 associated with the same pixel) to the prediction evaluating circuit 19.

The prediction evaluating circuit 19 determines the correct value (0 or 1) of the image information of the pixel under consideration (to be processed) by referring to the information 207 and the predicted symbol 206. More specifically, when the predicted symbol 206 has a value of 1, if the information 207 indicates that the pixel value is not equal to the predicted symbol, then the prediction evaluating circuit 19 outputs a 0 as the value of the image information of the pixel under consideration. On the other hand, if the information 207 indicates that the pixel value is equal to the predicted symbol, then the prediction evaluating circuit 19 outputs a 1. When the predicted symbol 206 has a value of 0, the prediction evaluating circuit 19 outputs a 1 or a 0 in a similar manner depending on the evaluation result.

The amount-of-generated-codes monitor 14 monitors the data length of the encoded information encoded by the encoder 15. On the basis of the data length, the amount-of-generated-codes monitor 14 outputs a flag for each band having a predetermined size thereby controlling the operation of the gray level converter 13 (to convert the data into a 2-bit-per-pixel or 1-bit-per-pixel form in response to the flag) so that the compression ratio is within the predetermined desired range. The flag is also supplied to the flag memory 26 and stored therein. The information stored in the flag memory 26 is transmitted to the gray level conversion controller 20 in the decoding section.

On the basis of the received information, the gray level conversion controller 20 judges whether the image information applied to the gray level converter 21 has been subjected to the gray level conversion by the gray level converter 13. If the image information has been subjected to the gray level conversion, then the gray level conversion controller 20 outputs a control signal to the gray level converter 21 to perform gray level conversion.

In response to the control signal from the gray level conversion controller 20, the gray level converter 21 performs gray level conversion on each image information and supplies the resultant image information to the interface circuit 22. The interface circuit 22 outputs the image information to an external device such as a printer.

FIG. 3 illustrates examples of threshold matrices (each having a size of 2 pixels×2 pixels) used in the 4-level dithering process. The multilevel dithering circuit 24 (FIG. 2) performs 4-level dithering on the input 8-bit image information (0–255) on the basis of these threshold values as described in detail below. At first, 2×2 pixels of the image information are compared with first threshold values, and a level 0 is assigned to the pixels whose value is equal to or smaller than the first threshold values. Similarly, the pixels of the image information which have not been assigned level 0 in the above comparison process are further compared with second threshold values, and a level 1 is assigned to the pixels whose value is equal to or smaller than the second threshold values. Furthermore, the pixels of the image information which have not been assigned any level in the previous comparison process steps are compared with third threshold values, and a level 2 is assigned to the pixels whose value is equal to or smaller than the third threshold values. The remaining pixels of the image information whose value is greater than the third threshold values are assigned a level 3. As a result of the above process, each pixel is represented in 2 bits (or 4 levels).

In the present embodiment, pixels are grouped into bands and the encoding mode for each band is switched depending on the amount (cumulative amount) of the encoded data which has already been generated.

The switching of the encoding mode is accomplished by controlling the gray level of the image to be encoded. That is, when each pixel of the initial image information is represented in 4 levels (2 bits), if the 4-level dithered image is directly encoded, then the encoding will be reversible while the encoding will be irreversible if the 4-level dithered image is encoded after being converted into a 2-level dithered image.

FIG. 4 is a schematic which illustrates of the process of dividing an image into bands. In this specific example, the image is divided into 6 bands. There are provided flag areas corresponding to the respective bands so that the value of each flag (corresponding to the value stored in the flag memory 26) indicates whether the 4-level dithered image of the corresponding band is encoded directly without being converted into a 2-level dithered image (the flag=0) or encoded after being converted into a 2-level dithered image (the flag=1).

In the decoding section, the type of the dithered image of each band is determined on the basis of the value of the corresponding flag (by the gray level conversion controller) and the gray level conversion mode is switched to a correct mode.

Figure 5:
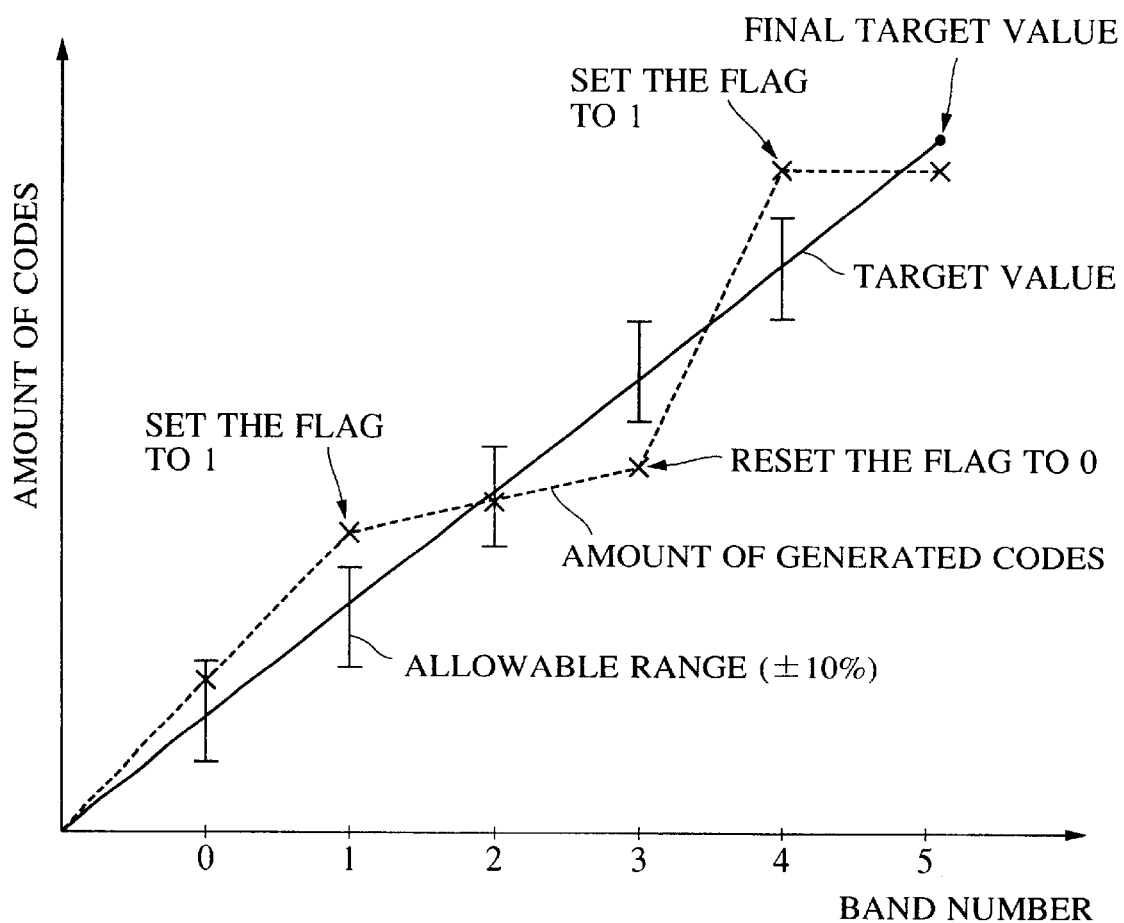
FIG. 5 is a graph which illustrates a method of switching the encoding algorithm depending on the amount of generated codes.

FIG. 5 is a schematic illustration of the operation of setting or resetting the flag for each band depending on the amount of the encoded data relative to the reference value (desired value).

In FIG. 5, the solid slanted line extending from the origin to the final target value (the calculated amount of decoded data with a desired image compression ratio) represents the desired values in terms of the amount of encoded data for the respective bands. The vertical solid lines indicate the allowable range of the cumulative amount of the decoded data at the end of each band. The broken lines indicate an example of the amount of encoded data actually generated.

The allowable range is for example from –10% to +10% of the reference value in terms of the amount of encoded data for each band.

The method of controlling the amount of encoded data in the process of encoding one page of image information band by band will now be described below. In this specific example, each page of image information is divided into six bands.

In the first band (band 0), the image data is encoded into the 2-bit-per-pixel form. In the specific example shown in FIG. 5, the amount of the encoded data at the end of band 0 is within the allowable range, and thus the flag remains in the initial state (=0).

The encoding of the image data in band 1 is performed in a mode determined by the value of the flag. In this case, the flag has a value of 0, and therefore the 2-bit-per-pixel image data is directly encoded. At the end of band 1, the cumulative amount of the encoded data from band 0 through band 1 is calculated and it is judged whether the cumulative amount is within the allowable range (this judgement is performed by the amount-of-generated-codes monitor 14). In the specific example shown in FIG. 5, the cumulative amount of the encoded data at the end of band 1 is greater than the allowable maximum limit, and thus the flag is set from 0 to 1. In response to the change in the flag, the image data in band 2 is encoded into the 1-bit-per-pixel format so as to reduce the amount of the encoded data generated in band 2.

At the end of band 2, the cumulative amount of the encoded data from band 0 through band 2 is calculated. In this example, the cumulative amount is within the allowable range, and thus the flag remains in the state of 1. Since the flag remains in the same state, the encoding of the image data in band 3 is performed in the same mode as band 2.

At the end of band 3, the cumulative amount of the encoded data from band 0 through band 3 is calculated. In this example, the cumulative amount is smaller than the lower limit, and thus the flag is reset from 1 to 0. Since the flag is now in the state of 0, the encoding of the image data in band 4 is performed in the 2-bit-per-pixel mode so as to increase the amount of encoded data generated in band 4 toward the desired reference value.

At the end of band 4, the cumulative amount of the encoded data from band 0 through band 4 is calculated. Now the cumulative amount is greater than the upper limit, and thus the flag is set from 0 to 1 and the encoding of the image data in band 5 is performed in the mode corresponding to the state of 1 of the flag.

Thus the amount of the encoded data is controlled in the manner described above so that the total amount of encoded data of one page of image is within the allowable range of the final target value.

In the present embodiment, in the case where the cumulative amount of the encoded data is always smaller than the upper limit when image data is encoded in the reversible mode (flag=0) throughout a succession of bands, the flag may remain in the state of 0 as long as the above situation is maintained. In this case, it is possible to achieve not only the total amount of encoded data smaller than the reference value but also high quality in the resultant image.

Figure 6:
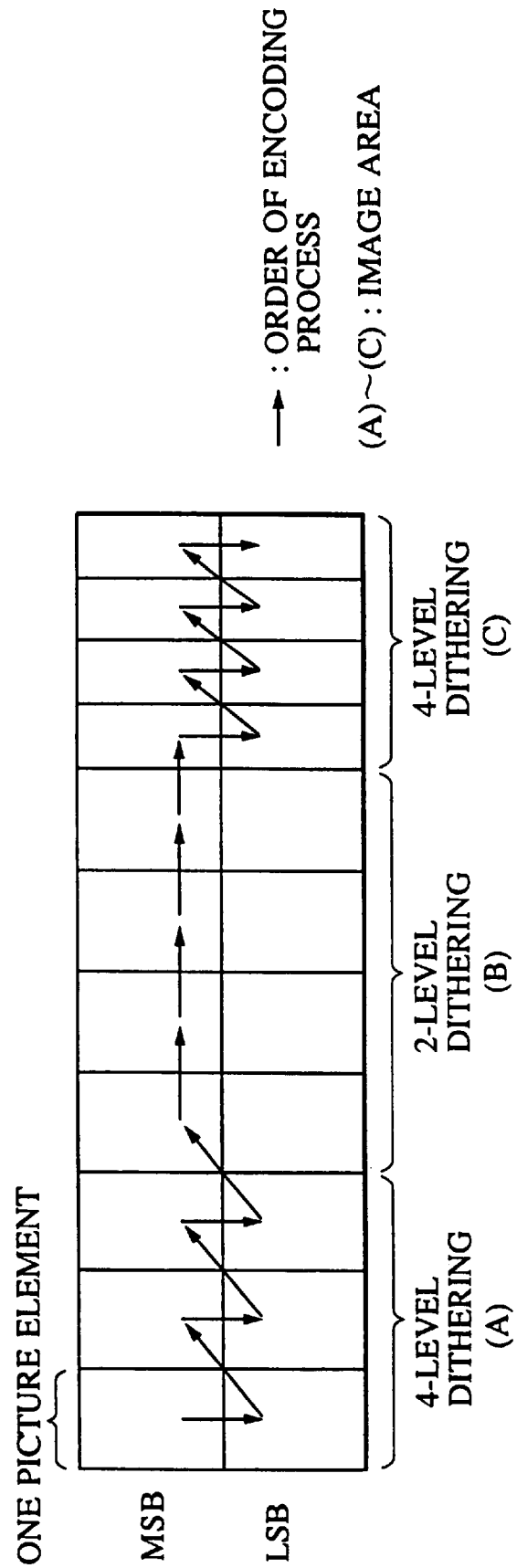
FIG. 6 is a diagram which illustrates an encoding process for the case where both a multilevel dithered image and a 2-level dithered image are present.

FIG. 6 illustrates the operation of switching the image encoding mode in response to the change in the state of the flag.

In the area (A), the image data is encoded in the form of 4-level dithered image. In this area, each pixel information consisting of 2 bits (the most significant bit (MSB) and the least significant bit (LSB)) is encoded in such a manner that the MSB is first encoded and then the LSB of the same pixel is encoded.

In the area (B), the image data is encoded in the form of 2-level dithered image. At the boundary from the area (A) to the area (B), the state of the flag is changed from 0 to 1, and the encoding mode is switched from the 4-level dithered image mode to the 2-level dithered image mode. In this specific embodiment of the invention, the encoding in the 2-level dithered image mode is performed after converting 4-level dithered image data into 2-level dithered image data by taking the MSB of each pixel data. At the boundary from the image area (B) to the image area (C), the state of the flag is changed from 1 to 0. In the image area (C), thus, encoding is performed in the same mode as the image area(A).

Figure 7:
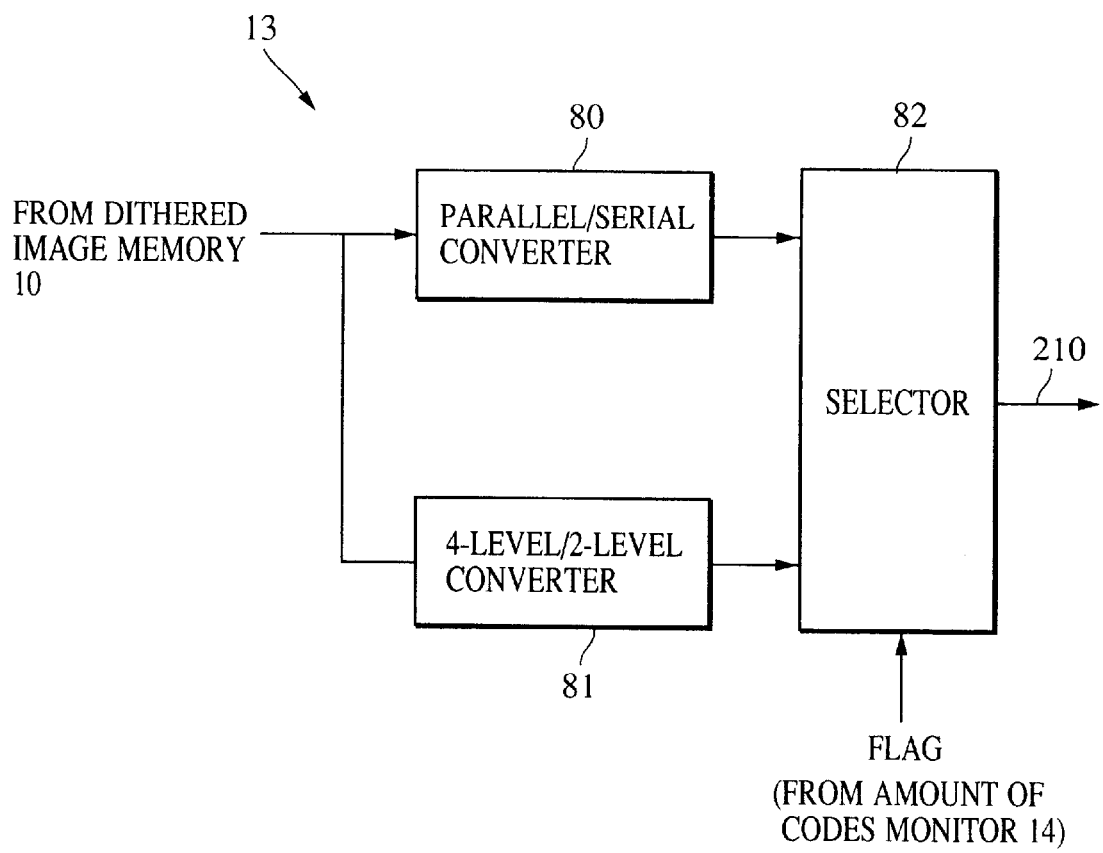
FIG. 7 is a block diagram of a gray level conversion circuit which may be used in the embodiment of FIG. 1.

FIG. 7 is a block diagram illustrating a specific example of the gray level converter 13 which selectively outputs either a 4-level dithered image or a 2-level dithered image used in the process shown in FIG. 6.

In FIG. 7, a parallel/serial converter 80 converts 4-level dithered image information (2-bit parallel signal) into a 1-bit serial signal representing the 4-level dithered image information, and supplies the resultant signal to a selector 82.

A 4-level/2-level converter 81 converts 4-level image information into 2-level image information. The resultant 2-level image information is supplied to the selector 82. In this specific embodiment, the conversion from 4-level to 2-level information is accomplished by generating 2-level data by taking only the MSB of each 4-level data (2-bit data).

In response to the value (1 or 0) of the flag output from the amount-of-generated-codes monitor 14, the selector 82 selects either the 4-level image information input from the parallel/serial converter or the 2-level image information input from the 4-level/2-level converter 81, and outputs the selected image data.

Figure 8:
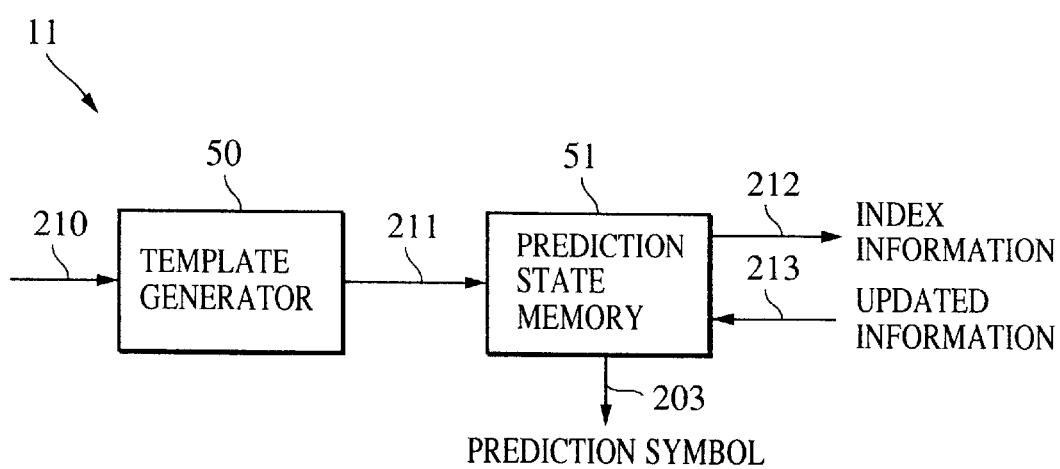
FIG. 8 is a block diagram of a predictor which may be used in the embodiment of FIG. 1.

FIG. 8 is a block diagram illustrating the predictor 11.

The encoded image information 210 is successively input to a template generator 50, and a predetermined number of lines of encoded image information is stored therein. On the basis of the stored image information, the template generator 50 outputs to a prediction state memory 51 the data 211 associated with neighboring pixels required to predict the image information associated with the pixel to be encoded.

The prediction state memory 51 includes a probability prediction table used in arithmetic encoding which is known in the art. Index information is stored in the probability prediction table for each possible state of image information of neighboring pixels around the current pixel to be encoded.

When data 211 is input to the prediction state memory 51 from the template generator 50, the prediction state memory 51 selects index information corresponding to the data 211 and generates a prediction symbol 203 corresponding to the index information from the probability prediction table. The resultant predicted symbol 203 is output to the prediction evaluating circuit 12 (FIG. 1). At the same time, the index information 212 used in the above process is output to the encoder 15.

After completion of the encoding operation using the above index information, the index information is updated and supplied as the updated index information 213 to the prediction state memory 51 of the predictor 11. The updated index information is stored in the prediction state memory 51 in an overwriting fashion. The encoder 15 learns the method of predicting codes each time encoding is performed. The updating of the index information is performed on the basis of the learning so that when image information having neighboring pixels at the same positions is input again, a correct prediction for the pixel to be encoded can be made with a higher probability.

Figure 9A:
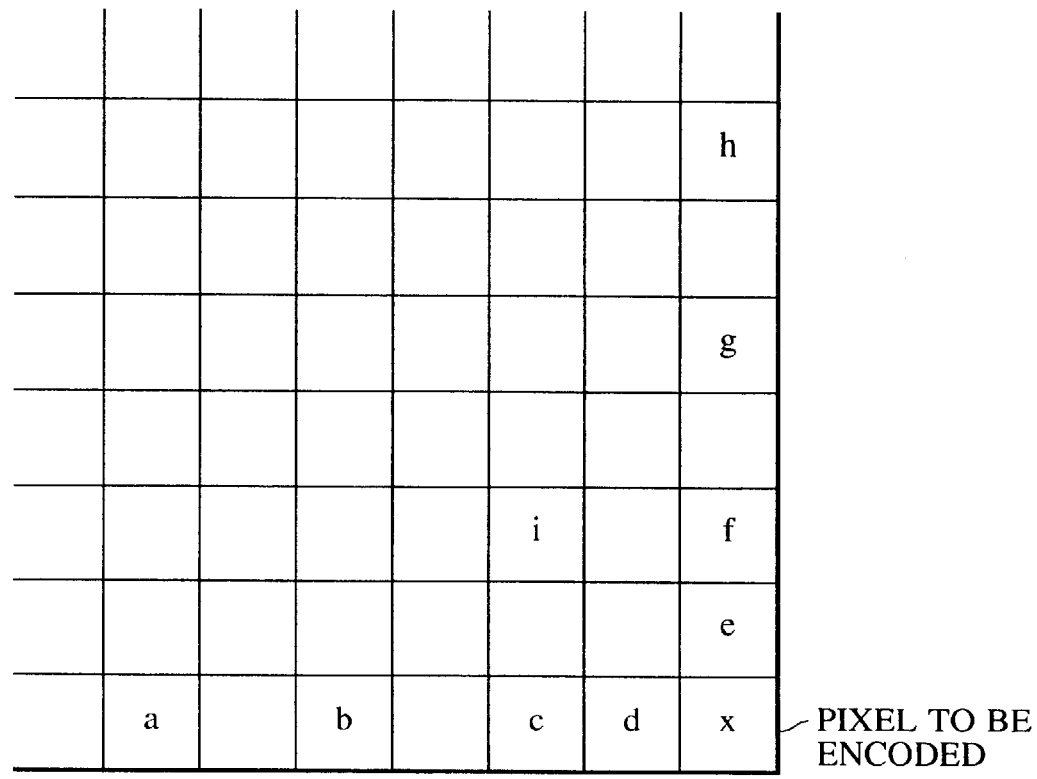
FIGS. 9a and 9b are a schematic diagram and a block diagram illustrating the positions of reference pixels of a dithered image.
Figure 9B:
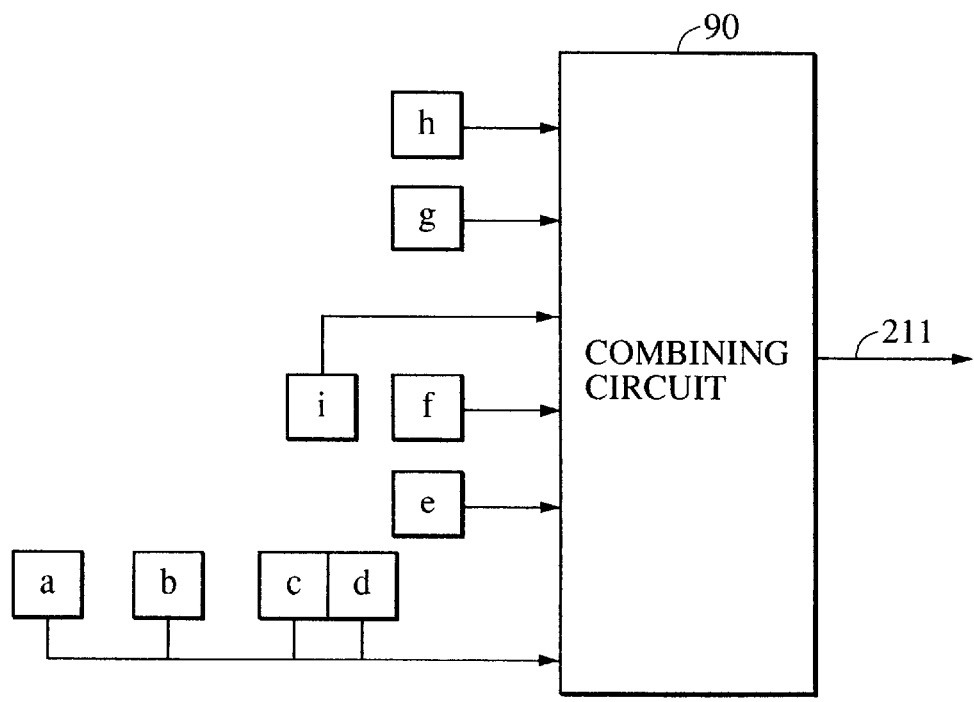

FIGS. 9a and 9b illustrate the process performed and the apparatus used by the template generator 50 using prediction reference pixels (neighboring pixels). Pixels c, d, e, and f adjacent to the pixel x to be encoded and pixels a, b, g, h, and i at locations corresponding to the dithering period (2×2 in this specific embodiment) are combined by a combining circuit 90 in the template generator 50 into a set of reference data, which is output as the data 211 described above to the prediction state memory 51 (FIG. 8).

Figure 10:
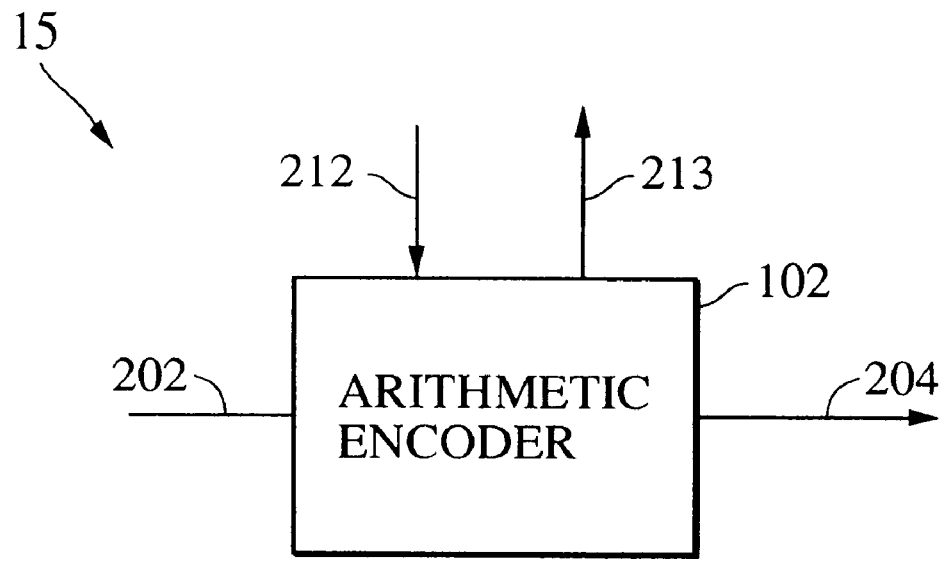
FIG. 10 is a block diagram of an encoder which may be used in the embodiment of FIG. 1.

FIG. 10 is a block diagram of the encoder 15. The index information 212 from the prediction state memory 51 in the predictor 11 (FIG. 8) is applied to an arithmetic encoder 102 in the encoder 15 (FIG. 1). After the encoding process, the arithmetic encoder 102 updates the index information 212 which it has received from the predictor 11, and supplies undated index information 213 to the predictor 11.

Figure 11:
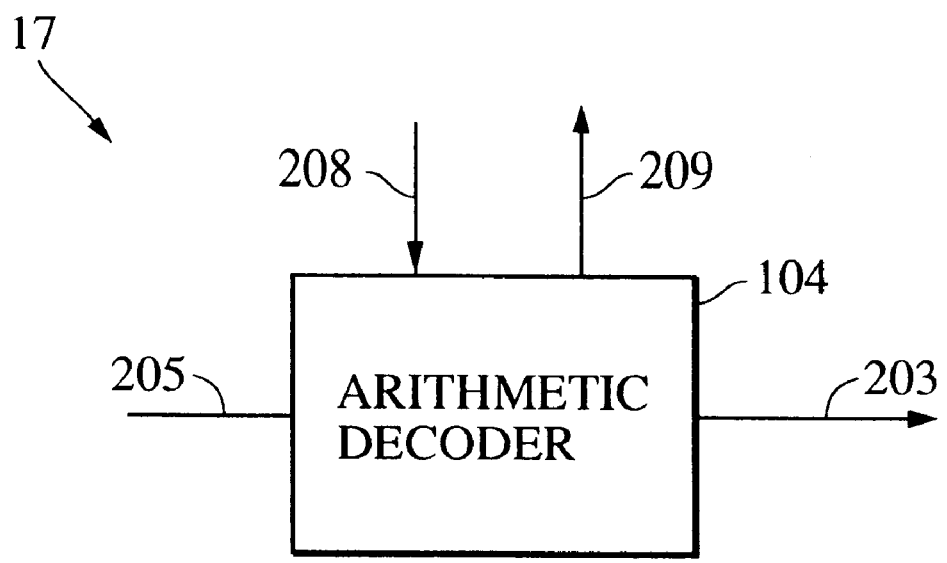
FIG. 11 is a block diagram of a decoding circuit which may be used in the embodiment of FIG. 1.

FIG. 11 is a block diagram of the decoding circuit 17. Index information 208 from the predictor 18 (FIG. 1) is input to an arithmetic decoder 104 in the decoding circuit 17. After the decoding process, the arithmetic decoder 104 updates the index information 208 and supplies updated index information 209 to the predictor 18.

The arithmetic encoding may be accomplished for example in accordance with a QM-Coder employed as the international encoding standard prescribed by ISO.

As described above, in the present embodiment of the invention, data can be encoded with a desired compression ratio without producing significant degradation in the image quality.

Second Embodiment

In a second embodiment of the invention, a multilevel image signal is converted into a DPCM-coded (differential-pulse-coded) signal wherein the encoding operation mode is switched between a reversible encoding mode and an irreversible encoding mode thereby controlling the amount of encoded data.

In the reversible DPCM mode, the difference data representing the difference among pixels is directly converted into a Huffman code. On the other hand, in the irreversible DPCM mode, the difference data is first quantized and then Huffman coding is performed on the quantized data. The irreversible encoding results in a smaller amount of encoded data than does the reversible encoding.

Figure 12:
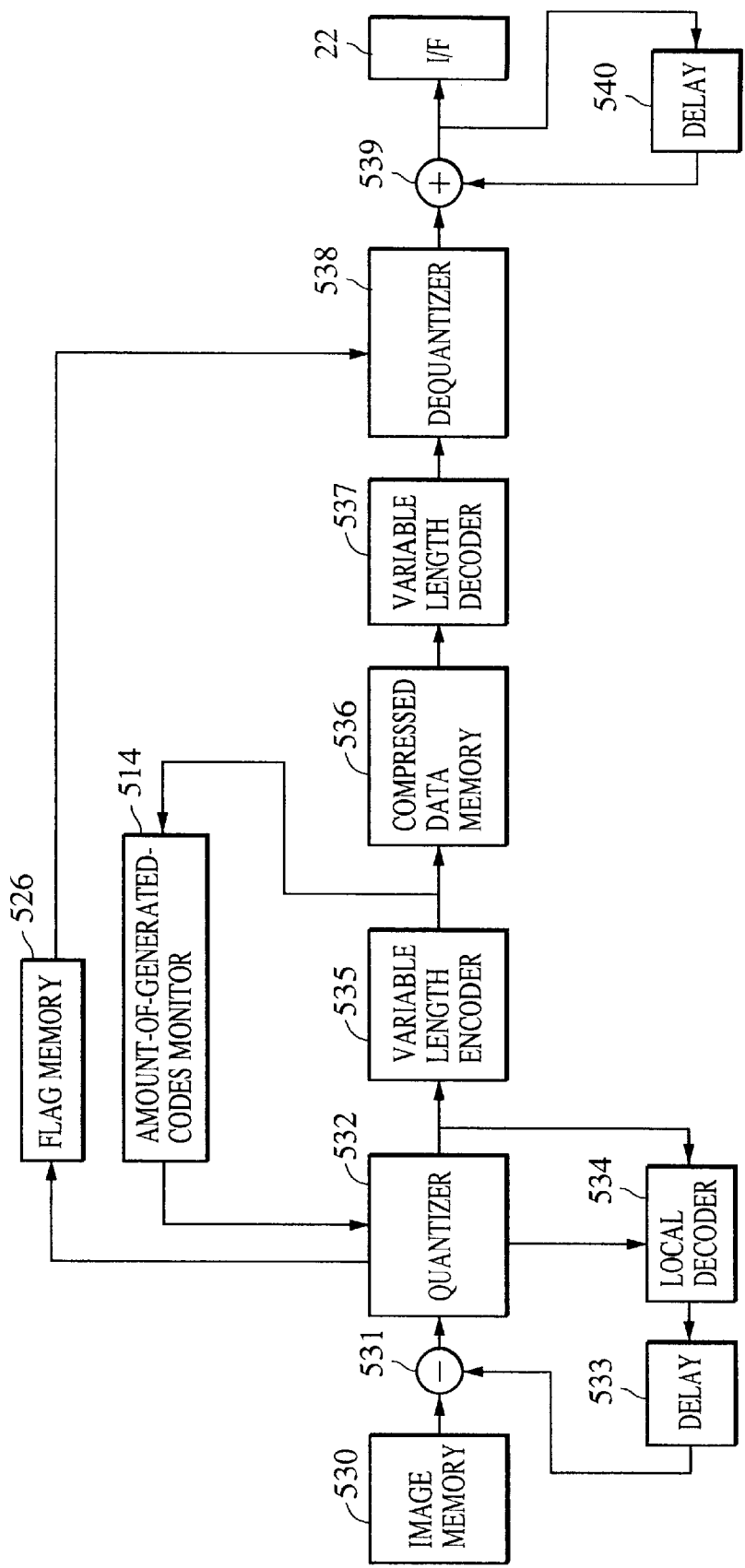
FIG. 12 is a block diagram generally illustrating an apparatus according to a second embodiment of the invention.

FIG. 12 is a block diagram generally illustrating the construction of an apparatus according to the second embodiment.

As shown in FIG. 12, the apparatus includes: an image memory 530 for storing 8-bit image data; a subtracter 531; a quantizer 532; a 1-pixel delay circuit 533; a dequantizing local decoder 534; a variable-length encoder 535; a compressed data memory 536; a variable-length data decoder 537; a dequantizer 538; an adder 539; and a 1-pixel delay circuit 540.

The subtracter 531 determines the difference between the image information of a pixel to be encoded supplied from the image memory 530 and the local decoded value of the previous pixel. The result is output as difference data from the subtracter 531. The difference data is quantized by the quantizer 532 and then applied to the variable-length encoder 535. Furthermore the quantizer 532 outputs a quantization switching flag, which will be described in detail later, to a flag memory 526. The difference data and the quantization switching flag are also input to the dequantizing local decoder 534 so that they are used in a local decoding operation.

The quantized difference data is applied to the variable-length encoder 535 and encoded using, for example, the Huffman encoding technique. The resultant data is stored in the compressed data memory 536. The quantized difference data is also dequantized and locally decoded by the local decoder 534. The locally decoded image information is delayed by the delay circuit 533 by an amount of time corresponding to one pixel, and the delayed data is applied to the subtracter 531 which determines the difference between the delayed data and the subsequent pixel data.

The data encoded by the variable-length encoder 535 is applied to the amount-of-generated-codes monitor 514. Depending on the difference between the amount of the encoded data actually generated and the expected amount, the amount-of-generated-codes monitor 514 generates a control signal which it supplies to the quantizer 532 thereby controlling the quantization operation mode by the quantizer 532. That is, the quantizer 532 performs quantization either in a reversible encoding mode or in an irreversible encoding mode depending on the control signal given by the amount-of-generated-codes monitor 514. In the reversible encoding mode, the quantization factor is set to 1 (and thus the difference value is divided by 1) so that the information is perfectly preserved. On the other hand, in the irreversible encoding mode, the quantization factor is set to a value greater than 1 (and thus the difference value is divided by the value greater than 1). In an alternative method, no quantization may be performed in the reversible encoding mode. In this case, the process will be simplified.

If quantization is performed with a quantization factor greater than 1, the distribution of the resultant difference data becomes concentrated near 0, and thus the data can be converted to a less amount of Huffman-coded data.

The quantization operation mode is switched in response to the state of the quantization switching flag which is generated by the quantizer 532 for each band and stored in the flag memory 526.

The compressed data output from the compressed data memory 536 is decoded by the variable-length data decoder 537. The decoded data is then dequantized by the dequantizer 538 in the mode specified by the quantization switching flag read from the flag memory 526. As a result of the above operation, difference data is produced. With the adder 539, the above difference data is added to the image information of the previous pixel which has already been decoded, thereby reproducing image information. The reproduced image information is output via the interface circuit 22. The reproduced image information is also supplied to the delay circuit 540 so that it is delayed and added to the subsequent difference data.

In the above dequantization process performed by the dequantizer 538, the quantization for each pixel is performed using a quantization parameter which is switched in response to the state of the flag stored in the flag memory 526.

The amount of the generated codes may be controlled in a similar manner to the previous embodiment described above with reference to FIG. 5. That is, if the amount of codes becomes greater than the upper limit, the encoding process is switched into an irreversible encoding mode, while the encoding process is switched into a reversible encoding mode when the amount of codes becomes smaller than the lower limit so that the amount of the finally generated codes will be close enough to the final target value.

In the present embodiment, as described above, image data is encoded either in the reversible encoding mode or the irreversible encoding mode depending on the amount of codes which have already been generated. This makes it possible to encode the image data with a desired compression ratio without producing significant degradation in the image quality.

In this specific embodiment, either the reversible or irreversible encoding mode is selected by switching the quantization parameter used in the DPCM process. Alternatively, the reversible encoding may be accomplished using the MH or MR coding technique and the irreversible encoding may be accomplished using the JPEG encoding technique. Furthermore, any encoding technique may be employed in the reversible encoding process as long as the encoded data can be reproduced perfectly into the original data, and any technique capable of encoding data with a high encoding efficiency may be employed in the irreversible encoding process.

Furthermore, two different irreversible encoding techniques may be employed and the encoding process may be switched between these two encoding technique. Furthermore, three or more reversible or irreversible encoding techniques having different encoding efficiencies may be employed and the mode of the encoding or quantizing operation may be switched among these encoding techniques.

Third Embodiment

Figure 13:
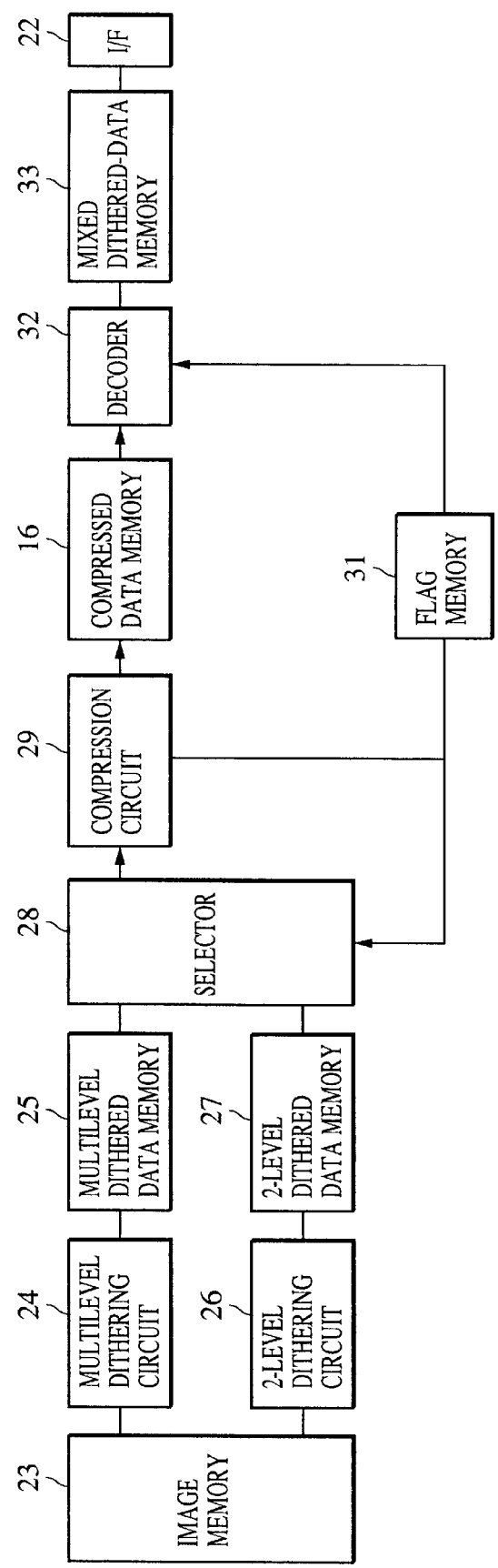
FIG. 13 is a block diagram generally illustrating an apparatus according to a third embodiment of the invention.

FIG. 13 is a block diagram generally illustrating an apparatus according to a third embodiment of the invention.

The apparatus includes: an 8-bit image memory 23 for storing 8-bit-per-pixel image data; a multilevel dithering circuit 24 (in this specific embodiment, the multilevel dithering circuit 24 is assumed to be a 4-level dithering circuit); a multilevel dithered image memory 25; a 2-level dithering circuit 26; a 2-level dithered image memory 27; a selector 28 for selecting either the 4-level dithered image data or the 2-level dithered image data; a compression circuit 29; a compressed data memory 16; a flag memory 31; a decoder 32; and a mixed dithered-data memory 33 for storing either 4-level or 2-level dithered image data (2-bit image data).

The 8-bit image data stored in the image memory 23 is supplied to the multilevel dithering circuit 24 and is converted into 4-level data. The resultant 4-level data is stored in the multilevel dithered image memory 25. The 8-bit image data stored in the image memory 23 is also supplied to the 2-level dithering circuit 26 and is converted into 2-level data. The resultant 2-level data is stored in the 2-level dithered image memory 27. (The above-described dithering process is performed using the 4-level dithering thresholds shown in FIG. 3 and the 2-level dithering thresholds shown in FIG. 14.) The selector 28 selects either 4-level dithered image data or the 2-level dithered image data in accordance with the quantization switching flag supplied from the compression circuit 29 which will be described in detail later, and outputs the selected image data to the compression circuit 29.

The image data is encoded by the compression circuit 29 and then stored in the compressed data memory 16.

The quantization switching flag is output not only to the selector 28 but also to the flag memory 31 and is stored therein so that the decoder 32 can refer to the flag in the decoding operation.

The decoder 32 reads encoded data from the compressed data memory 16 and determines whether each bit of the decoded data should be the MSB or the LSB of the 4-level dithered image data or otherwise the 2-level dithered image data on the basis of the quantization switching flag supplied from the memory 31. The resultant decoded data is stored in the 2-bit mixed dithered data memory 33.

From the mixed dithered data memory 33, the decoded image data is output via the interface circuit 22 to an external device such as a printer or an internal image outputting device.

Figures 14, 15:
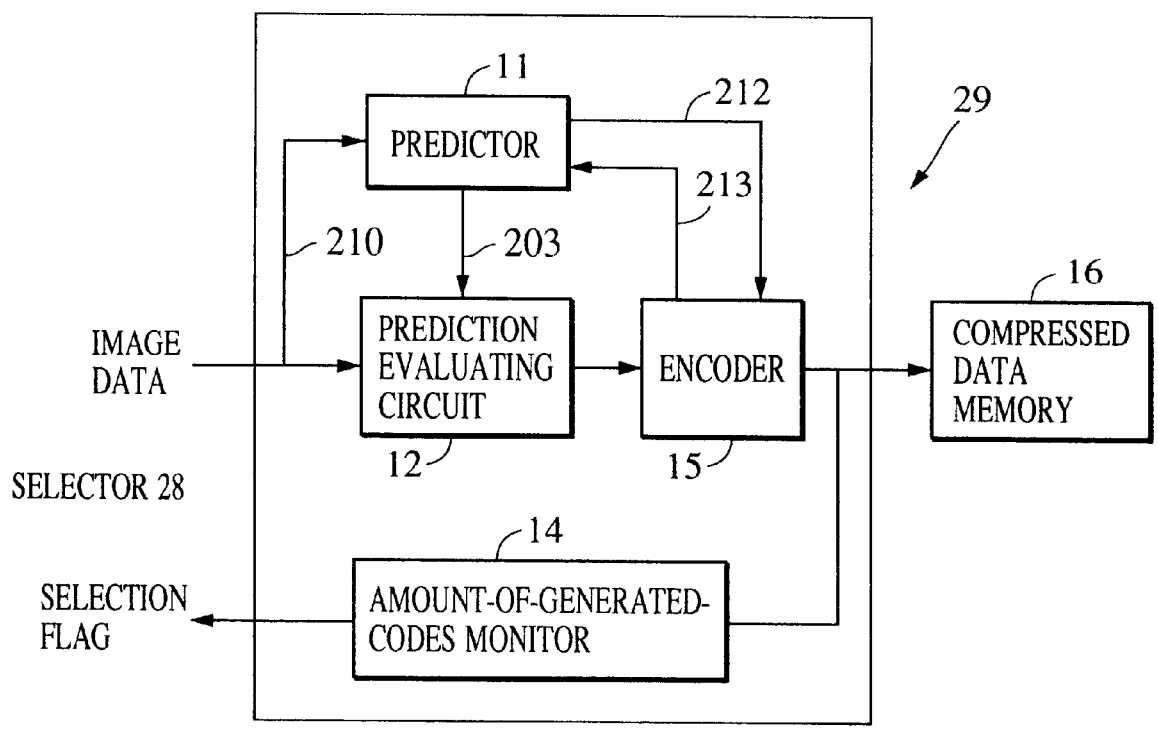
FIG. 14 illustrates 2-level dithering thresholds used in the third embodiment.
FIG. 15 is a block diagram illustrating the internal construction of a compression circuit which may be used in the third embodiment.

FIG. 15 is a block diagram illustrating the internal construction of the compression circuit 29.

The compression circuit 29 includes: a predictor 11; a prediction evaluating circuit 12; an encoder 15; and an amount-of-generated-codes monitor 14.

Dithered image data is input to the predictor 11 and also to the prediction evaluating circuit 12. The predictor 11 predicts whether each bit of a pixel to be encoded has a 0 or a 1 on the basis of the relationship between the pixel to be encoded and adjacent pixels.

The prediction evaluating circuit 12 judges whether the predicted value (0 or 1) of each bit is identical to the actual value of the pixel. The evaluation result is encoded by the encoder 15.

The encoded data generated by the encoder 15 is stored in the compressed data memory 16.

The encoded data is supplied to the amount-of-generated-codes monitor 14. The amount-of-generated-codes monitor 14 monitors the amount of the encoded data and controls the state of the quantization switching flag so that the encoding of the image data is performed with a desired compression ratio.

Figure 16:
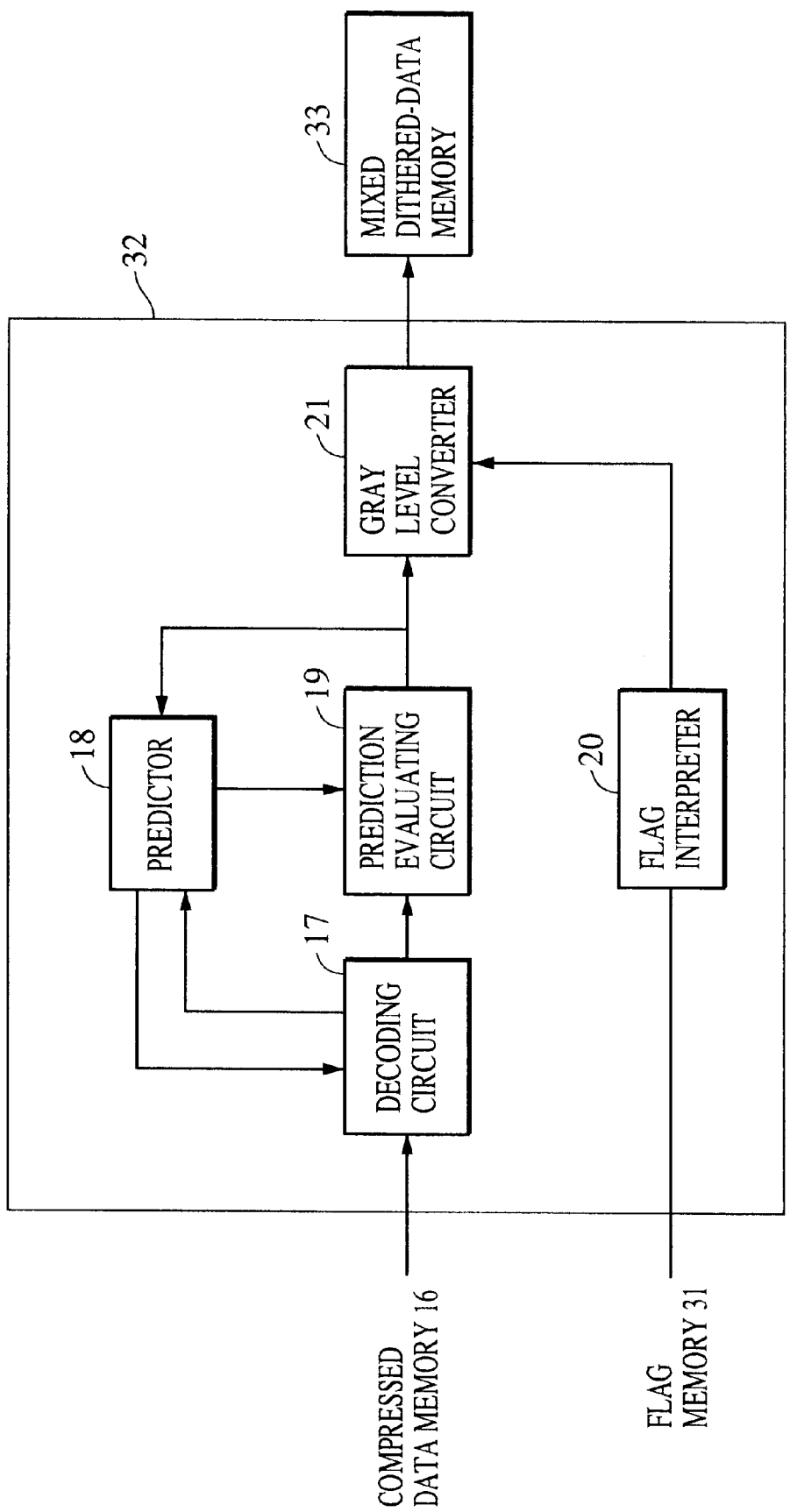
FIG. 16 is a block diagram of a decoder which may be used in the third embodiment.

FIG. 16 is a block diagram of the decoder 32.

The decoder 32 includes: a decoding circuit 17; a predictor 18; a prediction evaluating circuit 19; a flag interpreter 20 (having the same construction as that of the gray level conversion controller 20 shown in FIG. 1); and a gray level converter circuit 21. After the encoding is complete for all the dithered image data, a decoding operation starts.

The decoding circuit 17 decodes the evaluation result indicating whether the prediction is valid or invalid. The predictor 18 has the same construction as that of the predictor 11 and is used to predict the value (0 or 1) of each bit of the pixel under consideration on the basis of the value of neighboring pixels. On the basis of the above decoding result and the predicted value, the prediction evaluating circuit 19 generates a bit value of either 0 or 1 which represents the actual pixel value.

The flag interpreter 20 reads the state of the flag from the flag memory. On the basis of the state of the flag, the flag interpreter 20 determines whether the image data has been subjected to the gray level conversion in the coding section and generates a control signal to the gray level correcting circuit 21. The gray level correcting circuit 21 performs gray level correction on the 2-bit dithered image data of each pixel in either the 4-level dithering mode or the 2-level dithering mode in accordance with the control signal received from the flag interpreter 20. In the above process, the multilevel dithering is performed with a multilevel dithering circuit having the same construction as that shown in FIG. 2.

Figure 17:
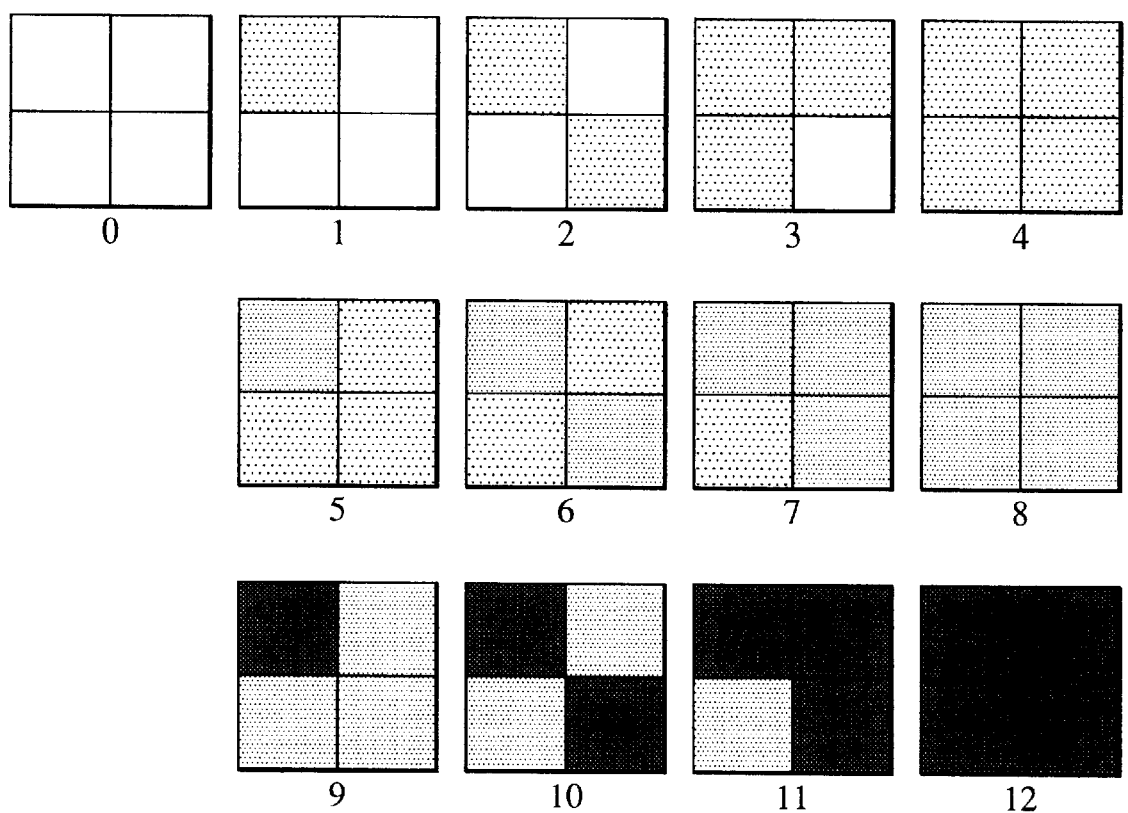
FIG. 17 illustrating an example of a set of dithered patterns capable of representing 13 levels wherein each dot is represented in 4 levels.

FIG. 17 illustrates examples of 4-level dithered patterns. Each dot can have four levels which are represented by white, light gray, dark gray, and black, respectively. A combination of four dithered dots can represent thirteen different gray levels.

As described above, in the present embodiment of the invention, image data can be encoded with a desired compression ratio without producing significant degradation in the image quality.

Fourth Embodiment

In the band processing technique described above, an image is divided into bands and processed band by band. This technique, however, has the disadvantage that if the processing mode is switched frequently between adjacent bands, transitional noise may appear at the boundary between such the adjacent bands.

The fourth embodiment of the invention provides a technique to avoid the above problem. In this technique, when a color image (or a YMC image, where Y denotes yellow, M magenta, C cyan) is subjected to band processing, a color, such as yellow, whose change at the boundary between adjacent bands cannot be easily recognized by human eyes is more preferentially converted from multilevel data to 2-level data than other colors.

Figure 18:
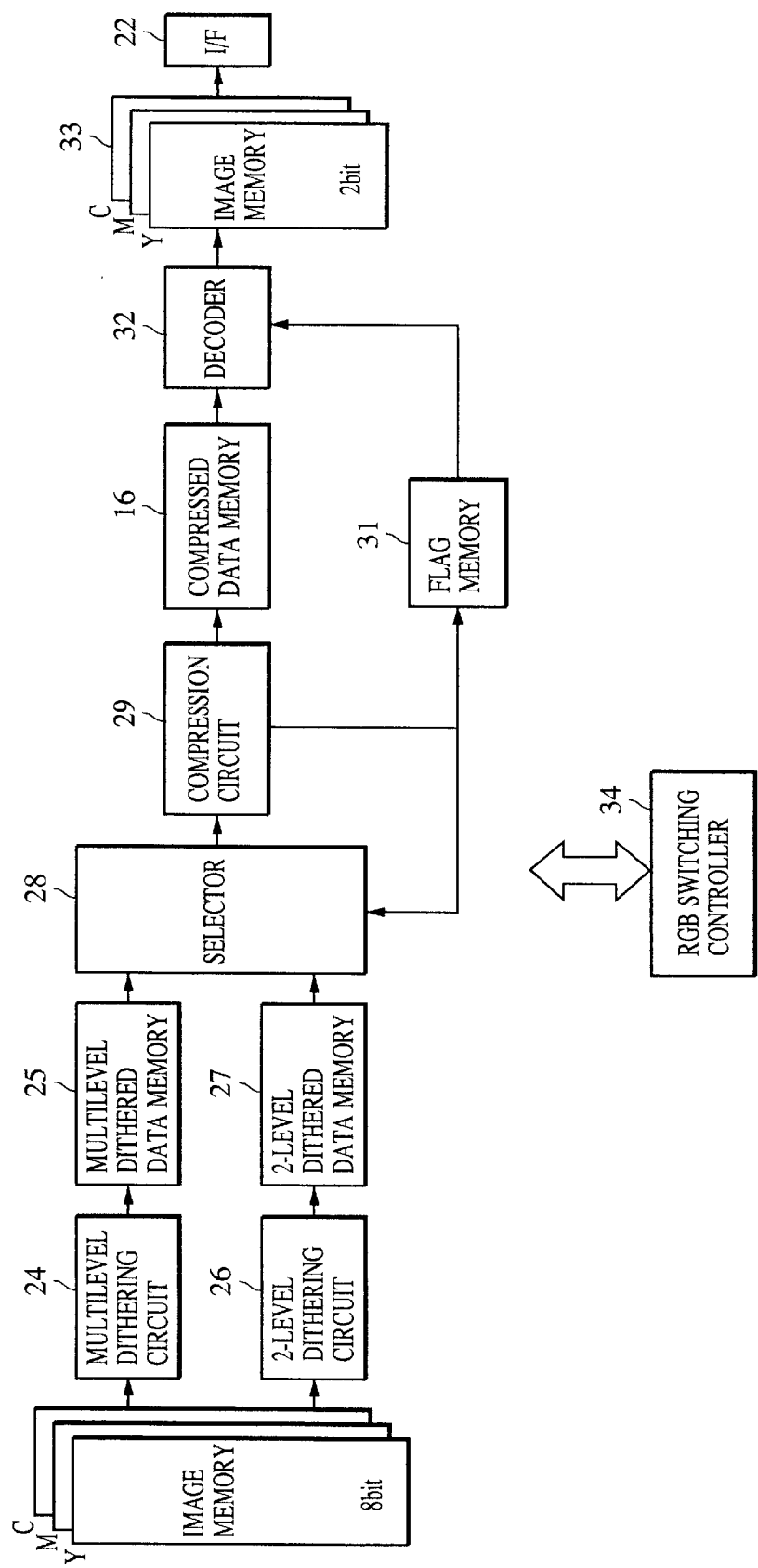
FIG. 18 is a block diagram generally illustrating an apparatus according to a fourth embodiment of the invention.

FIG. 18 illustrates an apparatus having such capability. Encoding is performed in either a multilevel dithering mode (4-level dithering mode in this specific embodiment) or a 2-level dithering mode in a similar manner to the embodiment described above with reference to FIG. 13 but preferentially in the order Y-band, M-band, C-band, Y-band, M-band. As opposed to the apparatus shown in FIG. 13, there is provided an additional RGB (Red, Green, Blue) switching controller 34 for controlling the selector 28 in terms of an-RGB switching operation and also for controlling the switching operation to control the cumulative amount of generated codes associated with an RGB signals in each band.

Figure 19:
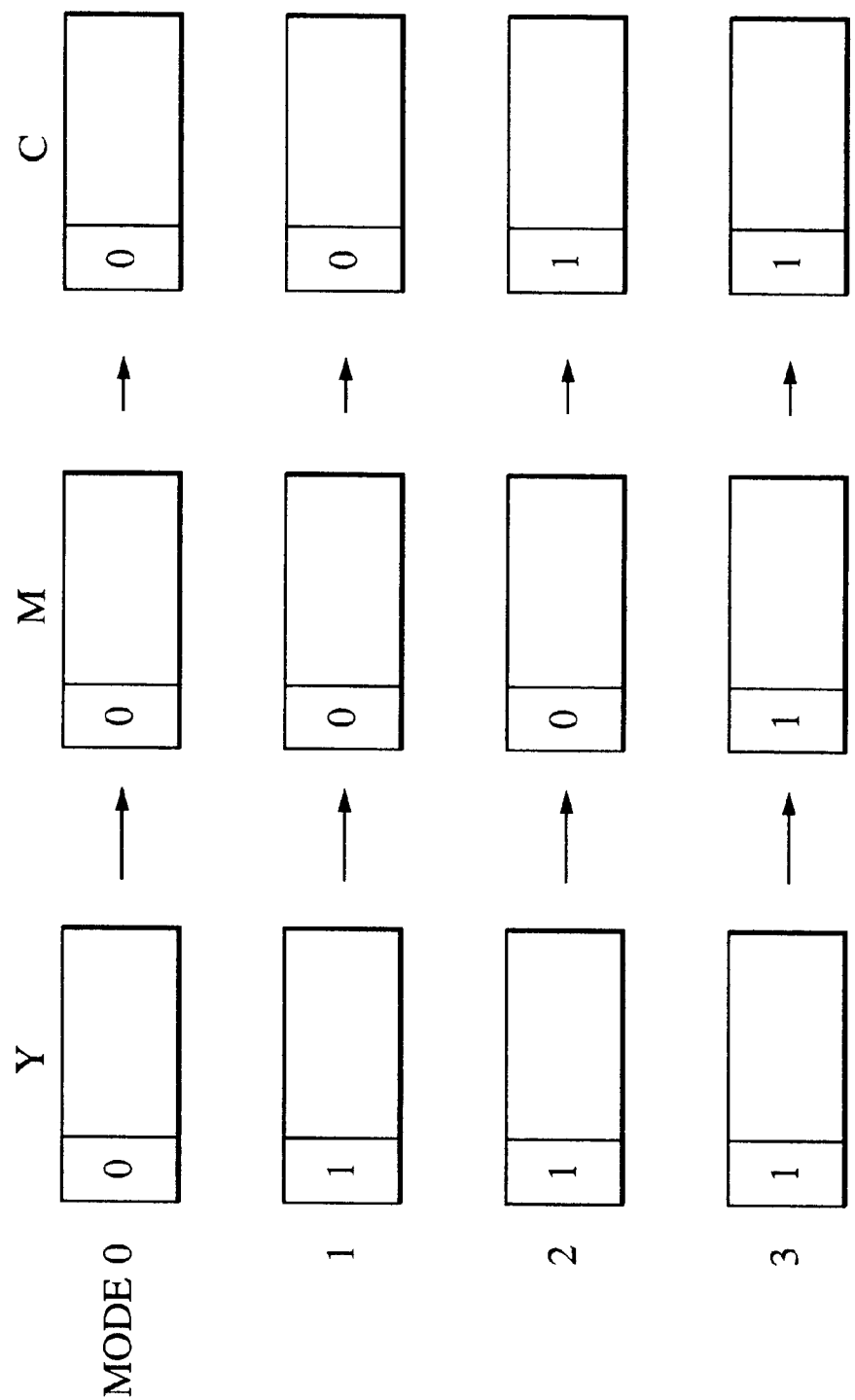
FIG. 19 is a group of diagrams which illustrate an example in which a switching flag is provided for each color of each band which exists in the fourth embodiment.

In the specific example shown in FIG. 19, a switching flag is provided for each color of each band wherein there are four modes corresponding to the combinations of colors and dithering modes.

In mode 0, 4-level dithering compression is performed for all colors of YMC in a band. When the process is performed in mode 0, the amount of codes becomes the greatest of all modes, and thus the highest quality can be obtained.

In mode 1, Y-data is subjected to 2-level dithering compression while M- and C-data are subjected to 4-level dithering compression.

On the other hand, in mode 2, Y- and C-data are subjected to 2-level dithering compression while M-data is subjected to 4-level dithering compression.

In mode 3, Y-, M-, and C-data are all subjected to 2-level dithering compression. In this mode 3, the amount of codes becomes the smallest of all modes, and thus the image quality becomes poor.

In the operation, the amount of codes generated is compared with the reference value as in the previous embodiments, and a proper one of the four modes described above is selected depending on the comparison result.

For example, when the amount of codes generated is considerably smaller than the reference value, the encoding is performed in mode 0. The encoding mode is switched in the order mode 0, mode 1, mode 2, mode 3 when the amount of generated codes exceeds the discrete reference values.

A specific example of the operation of switching the encoding mode will be described below with reference to FIG. 20. FIG. 20 illustrates a reference table which is referred to in the operation of switching the encoding mode. There are four cases which are classified according to whether the deviation of the amount of generated codes from the reference value is within an allowable range or not. In each case, the encoding mode is switched in a manner specified in the table depending on which mode is currently employed.

In the case where the amount of generated codes is smaller than the lower allowable limit, if the current encoding mode is 0 then the encoding mode is switched to 0, mode 1 to mode 0, mode 2 to mode 0, and mode 3 to mode 1 thereby greatly reducing the compression ratio.

In the case where the amount of generated codes is smaller than the reference value and greater than the lower allowable limit, if the current encoding mode is 0 then the encoding mode is switched to 0, mode 1 to mode 0, mode 2 to mode 1, and mode 3 to mode 2 thereby slightly reducing the compression ratio. In the case where the amount of generated codes is greater than the reference value and smaller than the upper allowable limit, if the current encoding mode is 0 then the encoding mode is switched to 1, mode 1 to mode 2, mode 2 to mode 3, and mode 3 to mode 3 thereby slightly increasing the compression ratio.

In the case where the amount of generated codes is greater than the upper allowable limit, if the current encoding mode is 0 then the encoding mode is switched to 2, mode 1 to mode 3, mode 2 to mode 3, and mode 3 to mode 3 thereby greatly increasing the compression ratio.

By switching the encoding mode in the above-described manner, the amount of codes associated with the compressed color image is precisely controlled. As a result, the difference in the compression ratio and thus the difference in the image quality among bands are minimized.

Furthermore, if the color component of the image signal which is of less importance to the visual sensation is encoded with a high compression ratio, then it becomes possible that the amount of generated codes will fall within a desired value without producing significant visible degradation in the image quality.

In the above embodiment, the color component signal may be an Lab or YIQ signal. In this case, chromaticity signals (a, b or I, Q) which are less important to the visual sensation may be encoded with a higher compression ratio thereby ensuring that the amount of codes is well controlled without significant visible degradation in the image quality.

Fifth Embodiment

The above embodiments may be modified such that the amount of generated codes is controlled by switching, for each pixel, the encoding mode between the multilevel encoding mode (4-level encoding mode) and the 2-level encoding mode thereby minimizing the perceptive switching noise.

Figure 21:
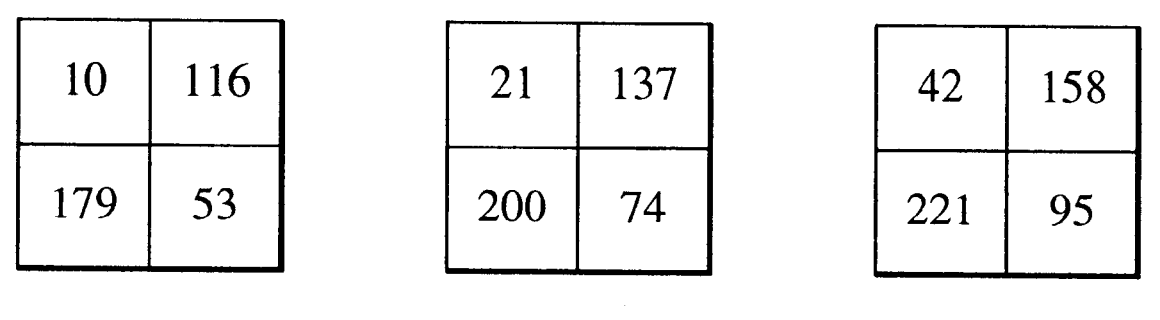
Figure 22:
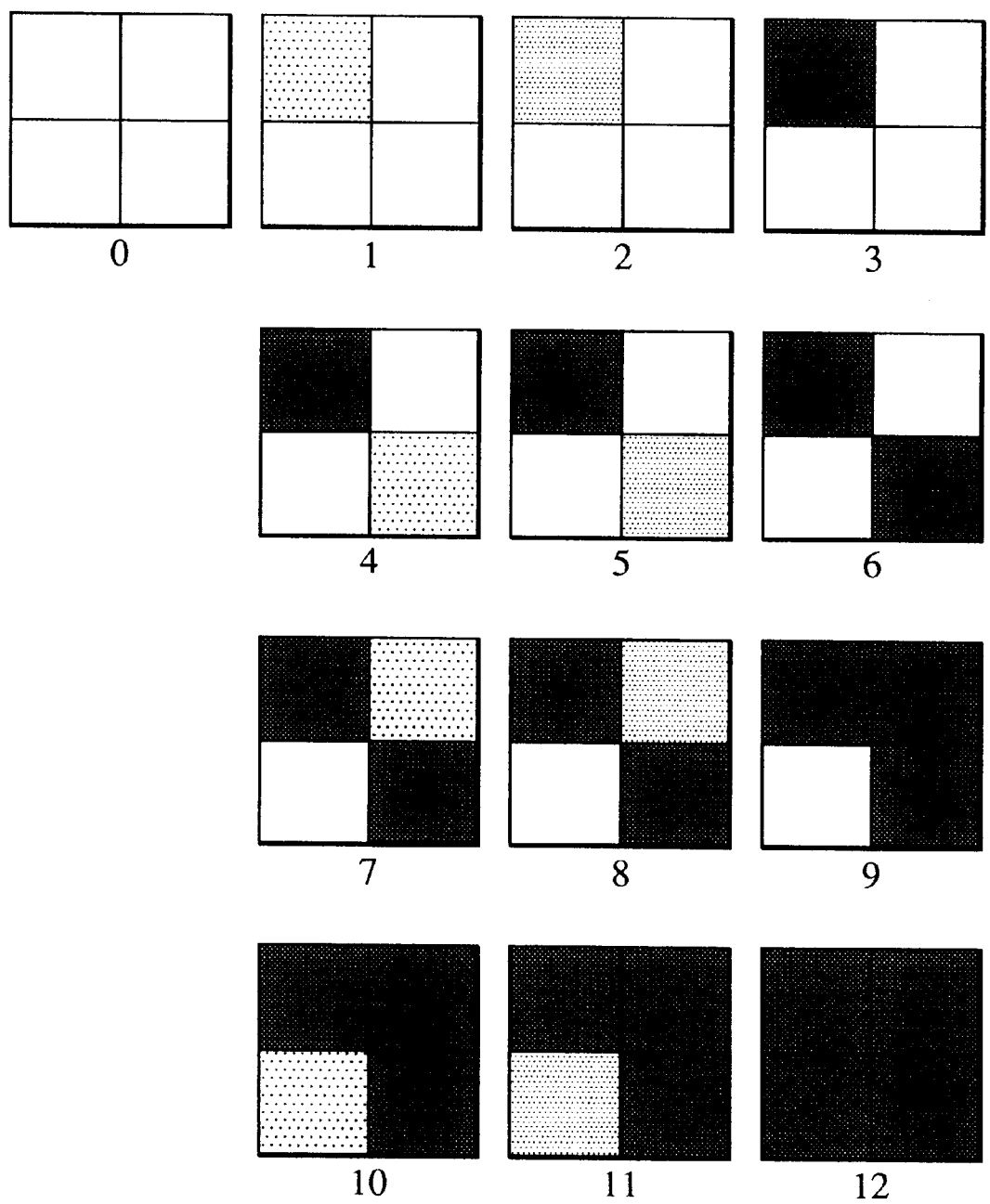
FIG. 22 is a set of dithered image patterns obtained using dithering threshold values in a fifth embodiment.

FIG. 21 illustrates another set of 4-level dithering threshold values. FIG. 22 illustrates a set of image patterns obtained using these dithering threshold values. Each pixel of an input image is converted into 4-level dithered image using the above threshold values, and the resultant data is stored in the dithered image memory. Of the 4-level dithered image data, some data are selected according to the rule described below and converted into 2-level dithered image data.

For example as shown in FIG. 23, four 2×2 dithered images are grouped into a 4×4 pixel set, and some pixels at particular positions in the pixel set are converted into 2-level image data in any of four modes 0 to 3. The compression rate increases with the change in mode from 0 to 3. In FIG. 23, the pixels at positions denoted by circles are converted from a 4-level dithered image into a 2-level image. An appropriate mode is selected for each band depending on the amount of generated codes relative to the reference value as in the previous embodiments. This makes it possible to minimize the perceptible degradation in the image quality due to the switching of the compression ratio.

In the second through fifth embodiments described above, the amount of generated codes may be smaller than the reference value as in the first embodiment. In such a situation, the flag is not changed and is maintained in the same state. This ensures that the final amount of generated codes becomes smaller than the desired reference value.

In the present embodiment, the amount of codes is controlled so that the image quality is changed in a minimum area in a band.

In the first through fifth embodiments described above, the image data is encoded in a mode selected depending on the amount of codes which have already been encoded, and thus the encoding can be performed in real time.

In the present invention, as described above, it is possible to encode the data with a desired compression ratio without introducing significant degradation in the quality of the encoded data.

Furthermore, in the encoding of image data, it is possible to encode the data with a desired compression ratio without introducing significant degradation in the image quality due to the encoding.

In the encoding of color image data, the visual property of a color image is effectively utilized in the encoding, and thus it is possible to encode color image data with a desired compression ratio without introducing significant degradation in image quality.

Sixth Embodiment

In the sixth embodiment, as in the first embodiment, an image is divided into a plurality of bands and the image in each band is encoded in an encoding mode determined depending on the detected amount of codes which have already been encoded prior to the band to be encoded.

The switching of the encoding mode may be accomplished by controlling the gray level of the image to be encoded as in the first embodiment.

In this embodiment, the original image data which has not been encoded yet is represented in 4 levels (4-level dithered image data). When the 4-level dithered image is directly encoded, the encoding will be reversible. On the other hand, when the 4-level dithered image is encoded after being converted into 2-level dithered image data, the encoding will be irreversible.

Figure 24:
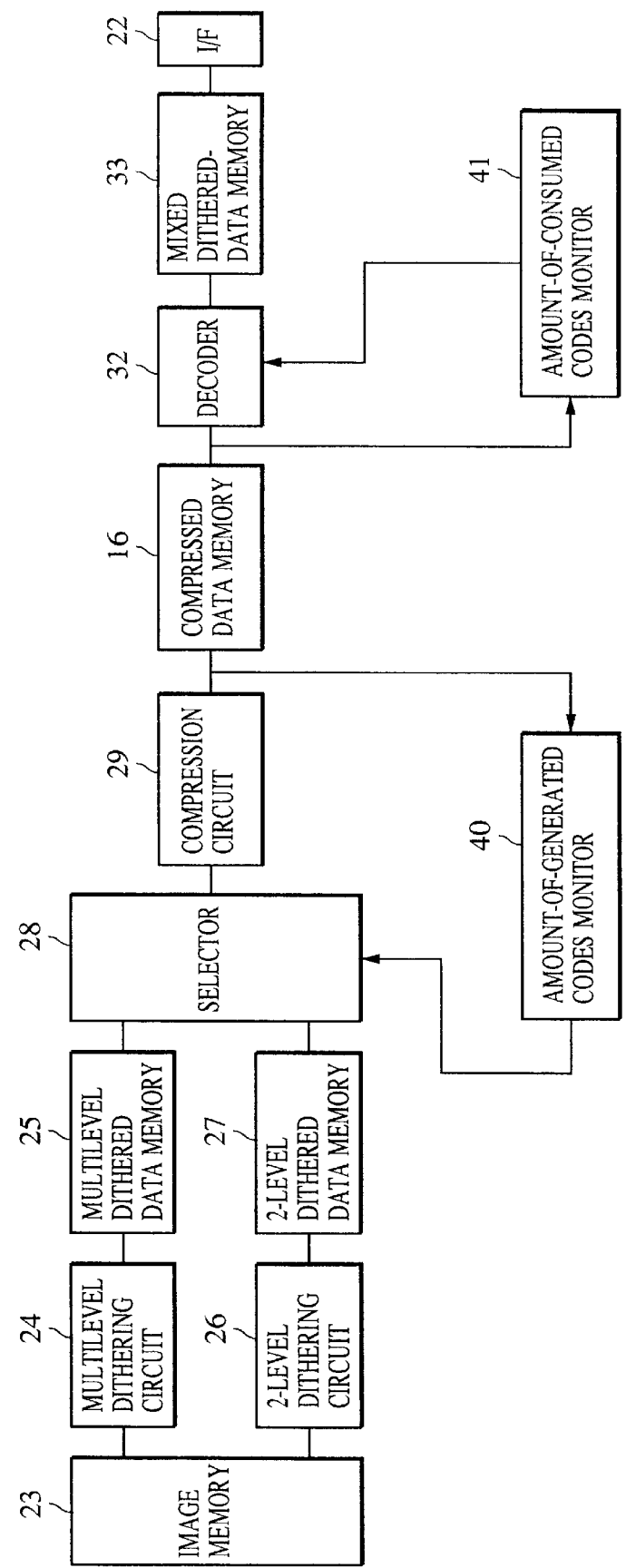
FIG. 24 is a block diagram generally illustrating an apparatus according to a sixth embodiment of the invention.

FIG. 24 is a block diagram of an apparatus employed in this embodiment. The apparatus has a construction similar to that shown in FIG. 13, and thus similar parts are denoted by similar reference numerals.

The apparatus includes: an image memory 23 (8 bit); a multilevel dithering circuit 24; a multilevel dithered image memory 25; a 2-level dithering circuit 26; a 2-level dithered image memory 27; a selector 28 for selecting either multilevel dithered image data or 2-level dithered image data; a compression circuit 29; a compressed data memory 16 for storing compressed data; an amount-of-generated-codes monitor 40 for monitoring the cumulative amount of generated codes associated with the bands which have already been compressed; an amount-of-consumed-codes monitor 41 for monitoring the cumulative amount of consumed codes; a mixed dithered-data memory 33 (2-bit memory) for storing either multilevel (4-level in this specific embodiment) or 2-level dithered image data; and an interface circuit 22 via which data is output to an external device such as a printer.

The operation of the apparatus will be described in detail below with reference to FIG. 24.

The 8-bit image data stored in the image memory 23 is supplied to the multilevel dithering circuit 24 and is converted into 4-level data. The resultant 4-level data is stored in the multilevel dithered image memory 25. The 8-bit image data stored in the image memory 23 is also supplied to the 2-level dithering circuit 26 and is converted into 2-level data. The resultant 2-level data is stored in the 2-level dithered image memory 27.

The selector 28 selects either the 4-level dithered image data or the 2-level dithered image data in accordance with the switching control signal supplied from the amount-of-generated-codes monitor 40 which will be described in detail later, and outputs the selected image data to the compression circuit 29. The 4-level or 2-level image data associated with each pixel is encoded by the compression circuit 29 and then stored in the compressed data memory 16. The data representing the amount of generated codes is also supplied to the amount-of-generated-codes monitor 40.

The amount-of-generated-codes monitor 40 compares the amount of actually-generated codes with the reference value shown in FIG. 5, and decides whether to employ the 4-level dithered image data or the 2-level dithered image data. The amount-of-generated-codes monitor 40 then outputs a switching control signal to the selector 28 so as to indicate whether the 4-level dithered image data or the 2-level dithered image data should be used in the encoding of the next band.

The decoder 32 decodes the input encoded data. The resultant decoded data is stored in the mixed dithered data memory 33. The encoded data is also supplied to the amount-of-consumed-codes monitor 41 which monitors the cumulative amount of generated codes.

The determination of whether the encoded data to be decoded is of the 4-level dithered data or of the 2-level dithered data is accomplished by the amount-of-consumed-codes monitor 41 on the basis of the detected amount of codes. 2-bit image data associated with each pixel is produced in accordance with whether the decoded data is the MSB (the first bit) or the LSB (the second bit) of 4-level dithered data, or 1-bit 2-level dithered data. The resultant image data is stored in the mixed dithered data memory 33.

In the above process, the amount-of-consumed-codes monitor 41 performs similar processing to that of the amount-of-generated-codes monitor 40. That is, the amount-of-consumed-codes monitor 41 monitors the cumulative amount of codes input from the compressed data memory 16 relative to the desired reference amount of codes. In response to the detected amount of codes, the decoding operation mode is switched between the 4-level dithered image mode and the 2-level dithered image mode. The decision of whether the decoding mode should be switched or not is made in a similar manner to the embodiment described above with reference to FIG. 5. That is, the cumulative amount of generated codes is evaluated at the end of each band, and if the cumulative amount is greater than the reference value then the decoding operation mode is switched to the 2-level dithered image mode. On the other hand, if the cumulative amount of codes is smaller than the reference value then the decoding operation mode is switched to the 4-level dithered image mode.

The 2-bit decoded data stored in the mixed dithered data memory 33 is output via the interface circuit 22 to an external device such as a printer.

Although in the embodiment described earlier with reference to FIGS. 13 and 15, the amount-of-generated-codes monitor 14 is disposed inside the compression circuit 29, the amount-of-generated-codes monitor 40 of the present embodiment is disposed outside the compression circuit.

The amount-of-generated-codes monitor 40 inputs the encoded data and outputs a control signal (flag) to the selector 28 to indicate whether the 4-level dithered image data or the 2-level image data should be selected so that the compression ratio of the encoded image data falls within the allowable range relative to the reference value.

Figure 25:
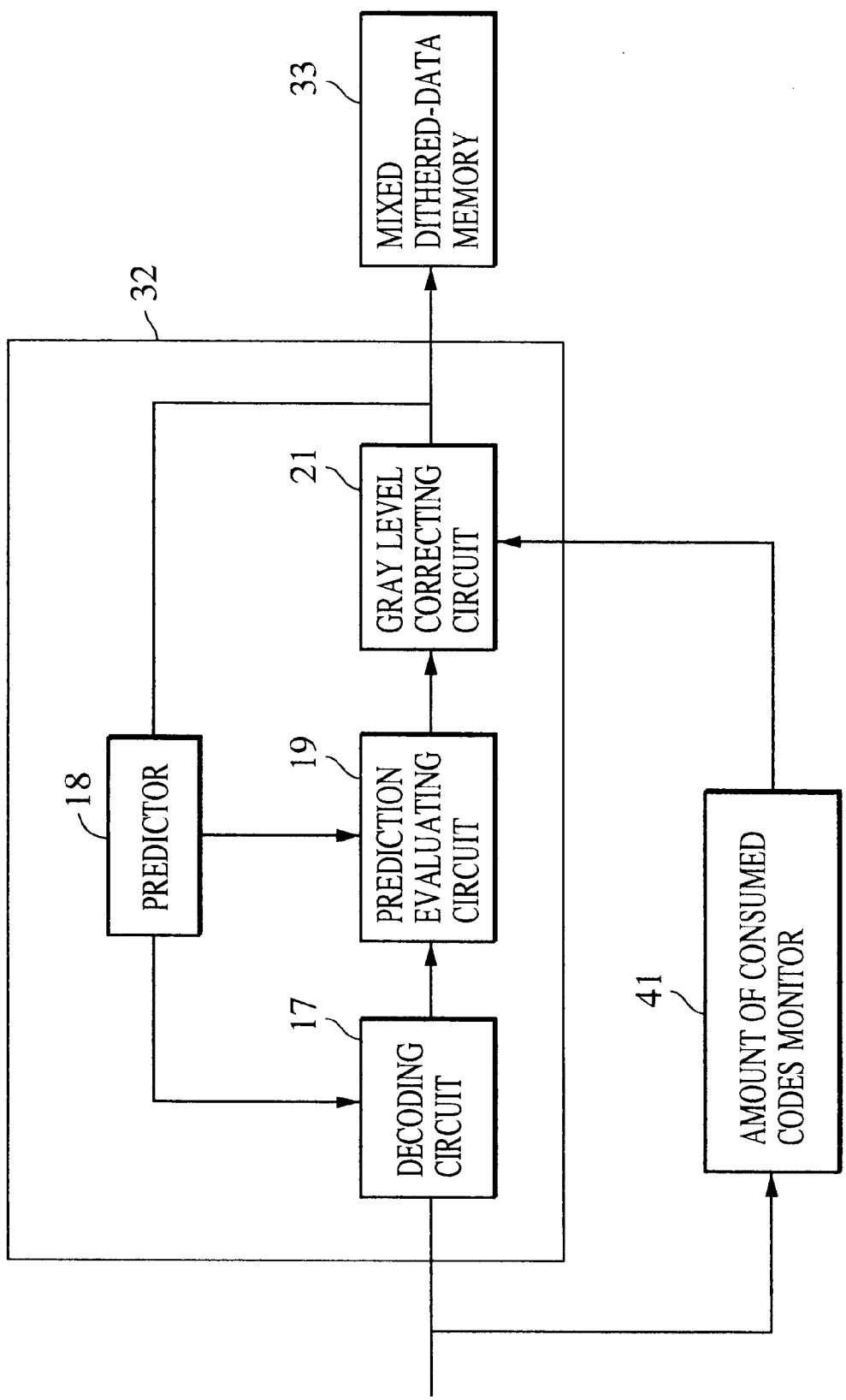
FIG. 25 is a block diagram of a decoder 32 which may be used in the sixth embodiment.

FIG. 25 is a block diagram illustrating the details of the decoder 32, the amount-of-consumed-codes monitor 41, and the mixed dithered data memory 33.

As shown in FIG. 25, the decoder 32 includes a plurality of sub-blocks which include: a decoding circuit 17 which performs processing inverse to that performed by the encoder 15; a predictor 18 which operates in a similar manner to the predictor 11; a prediction evaluating circuit 19; and a gray level correcting circuit 21 for correcting the gray level of the image data under the control of the amount-of-consumed-codes monitor.

After completion of the encoding for all image data, the decoder 32 starts a decoding operation.

The decoding circuit 17 decodes the evaluation result indicating whether the prediction performed by the predictor 12 is valid or invalid. The predictor 18 having the same construction as the predictor 11 predicts whether the pixel under consideration has a value of 0 or 1 for each bit plane on the basis of the values of neighboring pixels, and successively outputs the predicted values.

The prediction evaluating circuit 19 reproduces a correct value (0 or 1) from the predicted value output from the predictor 18 in conjunction with the decoded data output from the decoding circuit 17 (the information representing whether the predicted value is valid or invalid).

The amount-of-consumed-codes monitor 41 outputs a flag indicating whether the gray level should be corrected or not (that is whether the input data has been subjected to gray level conversion). In accordance with this flag, the gray level correction is performed in such a manner that a 4-level dithered image is dealt with as a 4-level dithered image while a 2-level dithered image is converted into a 4-level dithered image. The resultant image data is output to the mixed dithered-data image memory 33. In this embodiment, as opposed to the other embodiments, the flag can be produced in the decoding section, which leads to a further reduction in the amount of encoded data.

FIG. 26 illustrates examples of 4-level dithering threshold values for 2×2 pixels.

The 4-level dithering circuit 24 determines the 4-level dithering level of the input image data on the basis of these threshold values in a similar manner to the previous embodiments.

Specific examples of 4-level dithered patterns are illustrated in FIG. 22 in which four dots each capable of having any of four levels are combined into a block to represent thirteen different gray levels.

The 2-level dithering circuit 26 (FIG. 24) performs a 2-level dithering process using the threshold values defined for every 2×2 pixels shown in FIG. 14.

When 2×2 pixel image data is smaller than the threshold, then the image data is converted to 0 while the image data is converted to 3 when the data is greater than the threshold. This allows 2-level dithered image data to be present together with 4-level dithered image data.

The switching of the encoding operation mode may be performed in a similar manner to the embodiment described above with reference to FIG. 5.

In the present embodiment, as described above, the amount of generated codes is controlled so that the amount becomes sufficiently close to a desired amount (final target value).

In the present invention, if it is allowed that the amount of generated codes become smaller than the reference value, then the flag may remain in the state of 0 without being changed into the state of 1. This ensures that the final amount of generated codes can be smaller than the final target value.

Furthermore, the state of the flag generated in the decoding section may also be switched in a similar manner to that shown in FIG. 5. In accordance with the state of the flag, the operation mode of the gray level correcting circuit 21 is switched.

The predicting operation by the predictor 11 may be performed in the same manner as the embodiment described above with reference to FIG. 9 using the values of pixels located at positions also shown in FIG. 9.

Seventh Embodiment

In this seventh embodiment, the Huffman encoding algorithm is employed instead of the arithmetic encoding algorithm. In the operation of encoding image data into DPCM data, the encoding operation mode is switched between reversible and irreversible encoding modes.

In the reversible DPCM mode, the difference value relative to the predicted value is directly converted into a Huffman code.

On the other hand, in the irreversible DPCM mode, the difference value relative to the predicted value is first linear-quantized and then Huffman coding is performed on the quantized data.

Figure 27:
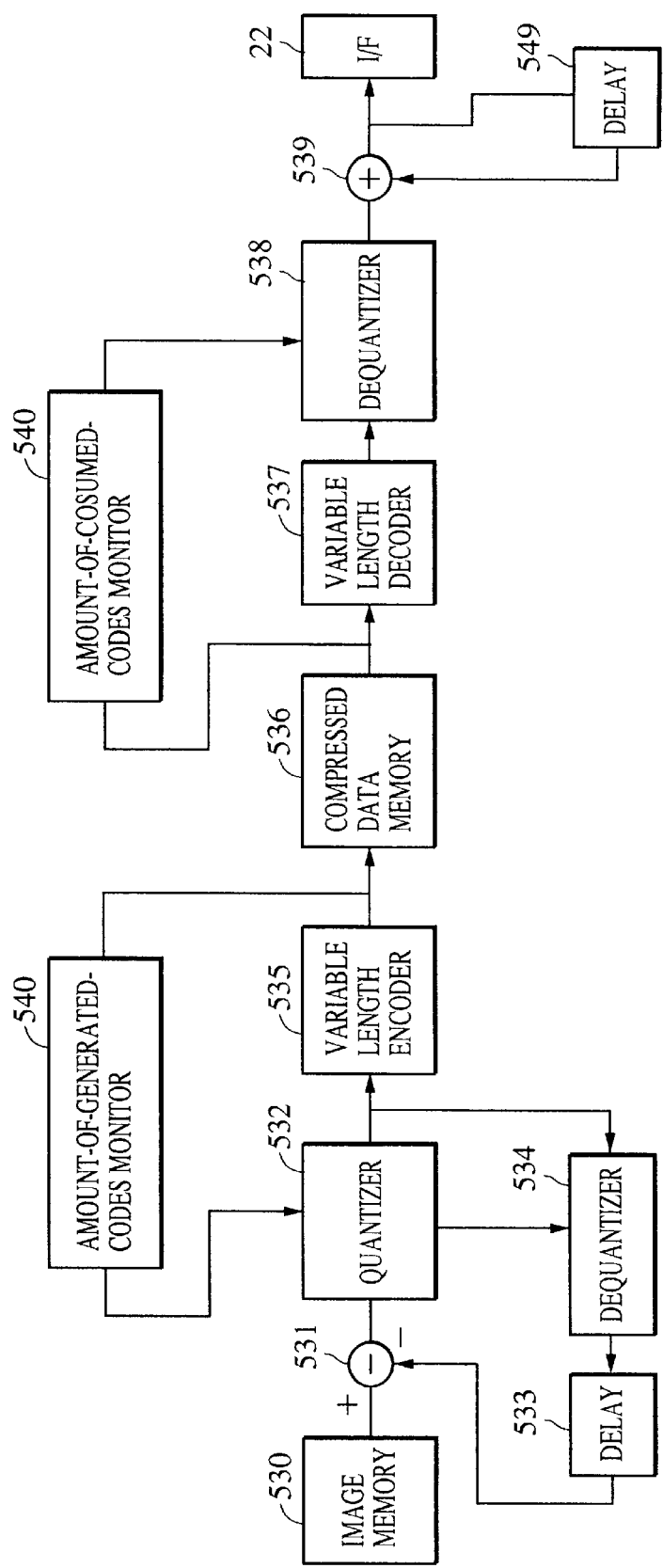
FIG. 27 is a block diagram generally illustrating an apparatus according to a seventh embodiment of the invention.

FIG. 27 is a block diagram generally illustrating an apparatus used in the seventh embodiment.

As shown in FIG. 27, the apparatus includes: an image memory 530 for storing 8-bit image data; a subtracter 531 for producing a value representing the difference between the predicted value and the actual value of a pixel to be encoded; a quantizer 532 for quantizing the difference value; a 1-pixel delay circuit 533; a dequantizer 534; a variable-length encoder (Huffman encoder) 535; a compressed data memory 536; a decoder 537 for decoding the variable-length encoded data; a dequantizer 538 having a similar construction to the dequantizer 534; an adder 539 for adding the predicted value and the decoded difference value thereby generating decoded data; a 1-pixel delay circuit 549; an amount-of-generated-codes monitor 540; and an amount-of-consumed-codes monitor 541.

Image data is read from the image memory 530 and applied to the subtracter 531. The subtracter 531 determines the difference between the image data read from the image memory 530 and the output of the previous pixel (predicted value), and outputs the result as a difference value. The difference value is quantized by the quantizer 532 and then encoded by the variable-length encoder (such as the Huffman encoder) 535 into a Huffman code or the like. The resultant encoded data is stored in the compressed data memory 536.

The quantized data output from the quantizer 532 is dequantized by the dequantizer 534 and is delayed by the delay circuit 533 by an amount of time corresponding to one pixel. The delayed output (predicted value) is subtracted from the subsequent image data from the image memory 530 by the subtracter 531 to produce a difference value representing the difference between the subsequent image data and the predicted value.

The information representing the amount of codes generated by the variable-length encoder 535 is input to the amount-of-generated-codes monitor 540. The amount-of-generated-codes monitor 540 compares the amount of generated codes with the reference value, and determines whether to increase or reduce the amount of generated codes on the basis of the comparison result in a similar manner to the first embodiment described above. The amount-of-generated-codes monitor 540 outputs a control signal to control the quantizer in according with the above determination.

The switching between the reversible encoding mode and the irreversible encoding mode is performed by changing the parameter given to the quantizer.

That is, in the reversible encoding mode, the quantization factor is set to 1 (and thus the difference value is divided by 1) so that the image information is perfectly preserved. On the other hand, if the quantization factor is set to a value greater than 1 then the amount of generated codes can be reduced while the encoding becomes irreversible.

The encoded data encoded by the variable-length encoder 535 is stored in the compressed data memory 536.

The encoded data stored in the compressed data memory 536 is decoded by the variable-length data decoder 537. The decoded difference value is then dequantized by the dequantizer 538. The adder 539 adds the dequantized difference value to the image data of the previous pixel (predicted value) and outputs decoded image data. The decoded image data is output to an external device via the interface circuit 22. The decoded image data is temporarily stored in the delay circuit 549, and is added to the difference value associated with the next pixel.

The encoded data supplied to the variable-length decoder 537 is also supplied to the amount-of-consumed-codes monitor 541. The amount-of-consumed-codes monitor 541 monitors the cumulative amount of generated codes (as in the monitor 540 in the encoding section), and determines whether the difference value associated with the pixel to be dequantized has been encoded in the reversible encoding mode (with a quantization factor of 1) or irreversible encoding mode (with a quantization factor greater than 1). In accordance with the determination, the dequantization mode is switched.

This makes it possible to decode the encoded data without having to receive from the encoding section a flag indicating the encoding mode associated with the encoded data. As a result, the amount of encoded data can be reduced.

In the specific embodiments described above, although the amount of generated codes is controlled by means of switching between a 4-level dithered image and a 2-level dithered image, the present invention is not limited to such control technique. For example the amount of generated codes may also be controlled by means of switching between an 8-bit (256-level) input image and a 4-level dithered image. Alternatively, the amount of generated codes may be controlled by means of switching between an M-level image and an N-level (M>N) image.

The present invention can be applied not only to the method and apparatus in which the amount of generated codes is controlled by switching the gray level of an image, but also to those in which the amount of generated codes is controlled by selectively employing one of plurality of encoding algorithms among which the difference in the amount of generated codes can be clearly defined.

In the present invention, as described above, in the operation of decoding the data encoded in a plurality of encoding modes which are switched among each other, the correct timing of switching the decoding mode is predicted by monitoring the amount of generated codes. This makes it possible to correctly decode the data without having to use an additional data such as a flag indicating the encoding mode. As a result, the encoding efficiency in the encoding section is improved.

Other Embodiments

In each embodiment described above, the encoding mode for a current image (in a current band or block or a current pixel) to be encoded is determined on the basis of the amount of codes generated for the previous image. However, the present invention is not limited to that. For example, the encoding mode may also be switched depending on the cumulative amount of generated codes for the range from the first band of one page of image to the current image to be encoded. In this case, the current image to be encoded is encoded in a standard encoding mode, and the temporal amount of codes obtained is added to the cumulative amount of codes obtained for the image data from the starting end to the previous image. The result is compared with the reference value to check whether the value is within the allowable range shown in FIG. 5.

In response to the comparison result, a correct encoding mode is selected and the current image is encoded again in the selected encoding mode. This allows the amount of codes to become closer to the desired value than in any embodiment described above.

Application to an Image Forming Apparatus

In this embodiment, the information processing apparatus according to any of the embodiments described above is connected to a computer or a printer thereby constructing an image forming apparatus.

Figure 28:
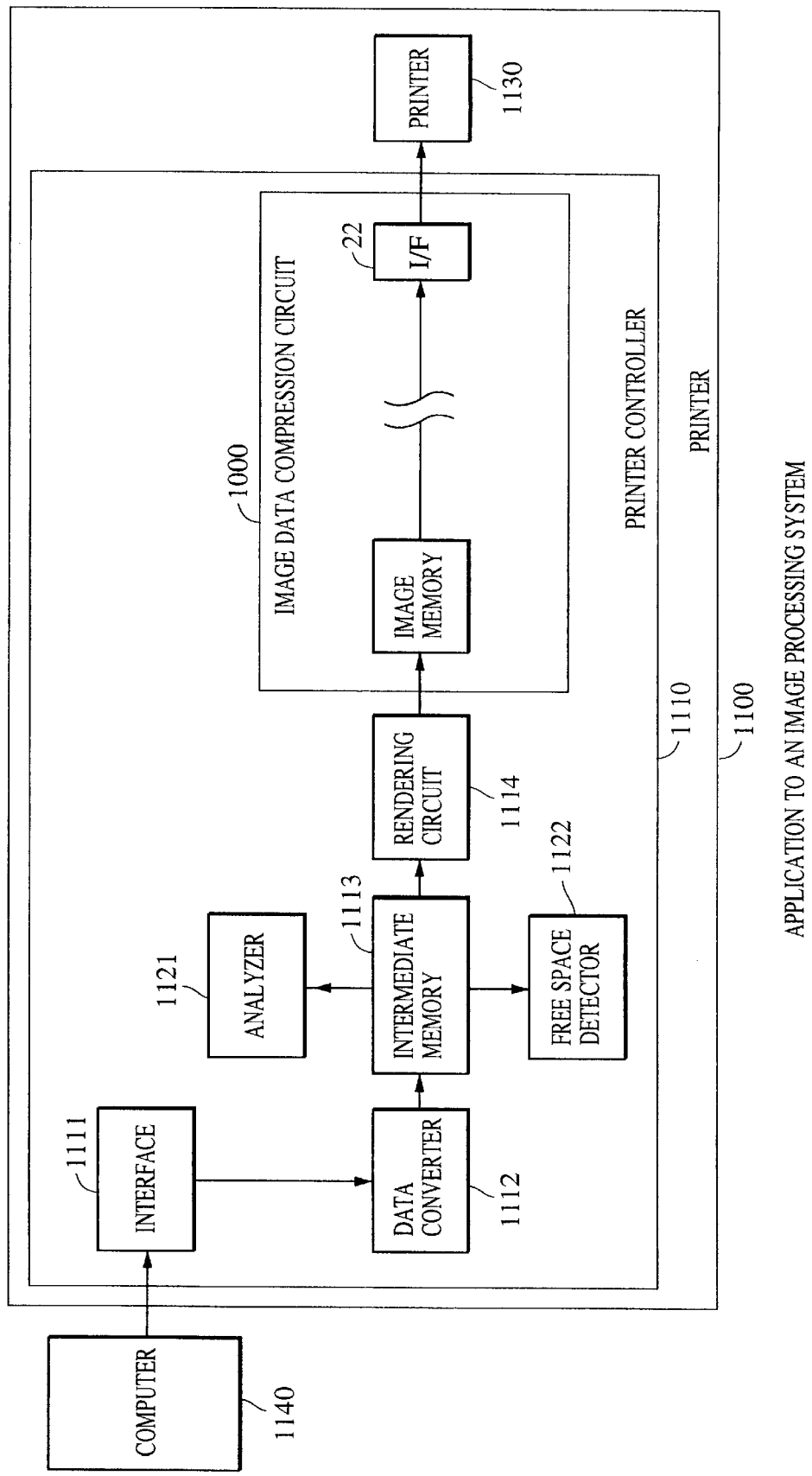
FIG. 28 is a block diagram generally illustrating an apparatus according to an eighth embodiment of the invention.

FIG. 28 illustrates an image forming system which inputs PDL image data from an external device such as a computer and supplies the image data to a printer after converting the image data into a form which can be dealt with by the printer.

In FIG. 28, a computer 1140 generates image data, for example PDL (page description language) data using an application software program such as a text editor or a graphics editor, and supplied the resultant image data to a printer 1130.

The PDL data from the computer 1140 is supplied to a data converter 1112 via an interface circuit 1111. In the printer 1130, one page of image data is divided into a plurality of bands and is processed band by band thereby reducing the required capacity of image memory.

The data converter 1112 generates a display list in which various commands associated with printing or drawing operations included in the PDL data are sorted so that the printing or drawing commands are executed in a correct order starting at the leading end of each band. The generated display list is stored in an intermediate memory 1113. If the whole one page of sorted data cannot be stored in the intermediate memory 1113, the process described above is performed for a part of the data.

A rendering circuit 1114 receives the display list stored in the intermediate memory 1113, and generates image data corresponding to each printing or drawing command for each band. The image data generated by the rendering circuit 1114 is in a form which can be used to produce an image on paper or the like. Thus, the image data converted from PDL form into a form which can be used to print the image is input to an image data compression circuit 1000 (information processing apparatus) similar to those employed in the previous embodiments. The input image data is stored in an image memory corresponding to the memory 10, 23, and 30 in the above embodiments.

In the image data compression circuit 1000, the image data is encoded and compressed while controlling the amount of encoded data in accordance with any method described above, and decompressed into image data which can be output to a printer. The resulting image data is output to the printer via an interface circuit. The printer prints an image in accordance with the received image data.

In this embodiment, as described above, the image data converted from the PDL data is output to the printer via the image data compression circuit 1000 and therefore the timing difference between the data conversion of the PDL data and the outputting operation of the printer can be dealt with.

While the present invention has been described with reference to illustrative embodiments, this description is not intended to be construed in a limiting sense. Various modifications can be possible without departing from the spirit and scope of the invention defined in the appended claims.

What is claimed is:

1. An information processing apparatus comprising:
    input means for inputting first image data and second image data, wherein each of the first image data and the second image data represents a respective one of two bands which correspond, respectively, to different spatial parts of the same page containing an image, each the first image data and the second image data consisting of plural bit data for each pixel thereof;
    encoding means for encoding the first image data and the second image data in order;
    monitoring means for monitoring the amount of encoded first image data on said page wherein the monitoring means outputs a bit flag; and which has a first state and a second state according to whether the encoded amount of the first band is within or is outside of an allowable range; and control means for controlling said encoding means to encode only a part of the bit data of said second image data on said page when the bit flag is in said second state, so that the total amount of encoding is maintained within a predetermined value.

2. An information processing apparatus according to claim 1, wherein each one of the first image data and the second image data consists of 2 bit data for each pixel.

3. An information processing apparatus according to claim 1, further comprising a multilevel dithering circuit which generates the first image data or the second image data by multilevel dithering processing of the input image data.

4. An information processing apparatus according to claim 1, further comprising decoding means for decoding the first image data or the second image data encoded by said encoding means.

5. An information processing apparatus according to claim 4, further comprising output means for outputting the image data obtained by operation of said decoding means.

6. An information processing apparatus according to claim 5, further comprising a printer for printing image data output by said output means.

7. A method of processing information comprising the steps of:

inputting a first image data and a second image data, wherein the first image data and the second image data represent, respectively, different bands which correspond, respectively, to different spatial parts of the same page containing an image, each of the first and second image data consisting of plural bit data for each pixel of said image;

encoding the first image data and the second image data in order;

monitoring the amount of encoded first image data on said page; and outputting a bit flag to indicate a first state and a second state according to whether the encoded amount of the first band is within or is outside of an allowable range; and controlling the encoding of said second image bit data on said page to encode only a part of the bit data on said page when the bit flag is in said second state, so that the total amount of encoding is maintained within a predetermined value.

* * * * *

UNITED STATES PATENT AND TRADEMARK OFFICE
CERTIFICATE OF CORRECTION

PATENT NO. : 6,266,449 B1　　　　　　　　　　　　　　　　　　　　Page 1 of 1
DATED : July 24, 2001
INVENTOR(S) : Hidefumi Ohsawa It is certified that error appears in the above-identified patent and that said Letters Patent is hereby corrected as shown below:

Column 3,
Line 52, "illustrating" should read -- illustrates --.

Column 8,
Line 67, "undated" should read -- updated --.

Column 10,
Line 14, "less" should read -- lesser --.

Column 11,
Line 1, "technique." should read -- techniques. --.

Column 13,
Line 6, "signals" should read -- signal --.

Column 18,
Line 45, "according" should read -- accordance --.

Column 20,
Line 8, "supplied" should read -- supplies --; and
Line 67, "flag; and" should read -- flag, and --.

Signed and Sealed this

Second Day of April, 2002

Attest:

JAMES E. ROGAN
Attesting Officer　　Director of the United States Patent and Trademark Office